US012114153B2

United States Patent
Youn et al.

(10) Patent No.: US 12,114,153 B2
(45) Date of Patent: Oct. 8, 2024

(54) AUTHENTICATION FOR RELAY

(71) Applicant: LG Electronics Inc., Seoul (KR)

(72) Inventors: Myungjune Youn, Seoul (KR); Laeyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 422 days.

(21) Appl. No.: 17/635,998

(22) PCT Filed: Aug. 19, 2020

(86) PCT No.: PCT/KR2020/011013
§ 371 (c)(1),
(2) Date: Feb. 16, 2022

(87) PCT Pub. No.: WO2021/034093
PCT Pub. Date: Feb. 25, 2021

(65) Prior Publication Data
US 2022/0279348 A1    Sep. 1, 2022

(30) Foreign Application Priority Data

Aug. 19, 2019 (KR) .................. 10-2019-0100936
Jan. 6, 2020 (KR) .................. 10-2020-0001613
May 19, 2020 (KR) .................. 10-2020-0059996

(51) Int. Cl.
*H04W 12/06* (2021.01)
*H04W 8/20* (2009.01)
(Continued)

(52) U.S. Cl.
CPC ............. *H04W 12/06* (2013.01); *H04W 8/20* (2013.01); *H04W 60/00* (2013.01); *H04W 88/04* (2013.01)

(58) Field of Classification Search
CPC ....... H04W 12/06; H04W 8/20; H04W 60/00; H04W 88/04; H04W 12/72; H04W 8/26;
(Continued)

(56) References Cited

U.S. PATENT DOCUMENTS

2019/0110238 A1    4/2019  Buckley
2021/0076301 A1*   3/2021  Yu ......................... H04W 48/08
2022/0124500 A1*   4/2022  Liu ....................... H04W 8/186

FOREIGN PATENT DOCUMENTS

WO    WO2018067956    4/2018
WO    WO2019047197    3/2019

OTHER PUBLICATIONS

3rd Generation Partnership Project; Technical Specification Group Services and System Aspects, "Procedures for the 5G System; Stage 2 (Release 16)," 3GPP TS 23.502 V16.1.1, dated Jun. 2019, 496 pages.
(Continued)

Primary Examiner — Huan V Doan
(74) Attorney, Agent, or Firm — Fish & Richardson P.C.

(57) ABSTRACT

One disclosure of the present specification provides a method for an SMF node to perform authentication. The method may include the steps of: receiving, from a relay UE, a Remote UE report message related to a Remote UE connected to the relay UE; transmitting a request message to a UDM node or an AMF node on the basis of the Remote UE report message including an SUCI of the remote unit; receiving a response message, including an SUPI of the Remote UE, from the UDM node or the AMF node; and transmitting an authentication request message, requesting authentication for the Remote UE, to an authentication server.

13 Claims, 26 Drawing Sheets

(51) Int. Cl.
*H04W 60/00* (2009.01)
*H04W 88/04* (2009.01)

(58) Field of Classification Search
CPC ..... H04W 76/11; H04W 76/14; H04W 76/30; H04W 92/18; H04W 12/08; H04W 76/10; H04L 63/0884; H04L 63/0892
See application file for complete search history.

(56) References Cited

OTHER PUBLICATIONS

3rd Generation Partnership Project; Technical Specification Group Services and System Aspects, "Security architecture and procedures for 5G system (Release 15)," 3GPP TS 33.501 V15.5.0, dated Jun. 2019, 192 pages.

* cited by examiner

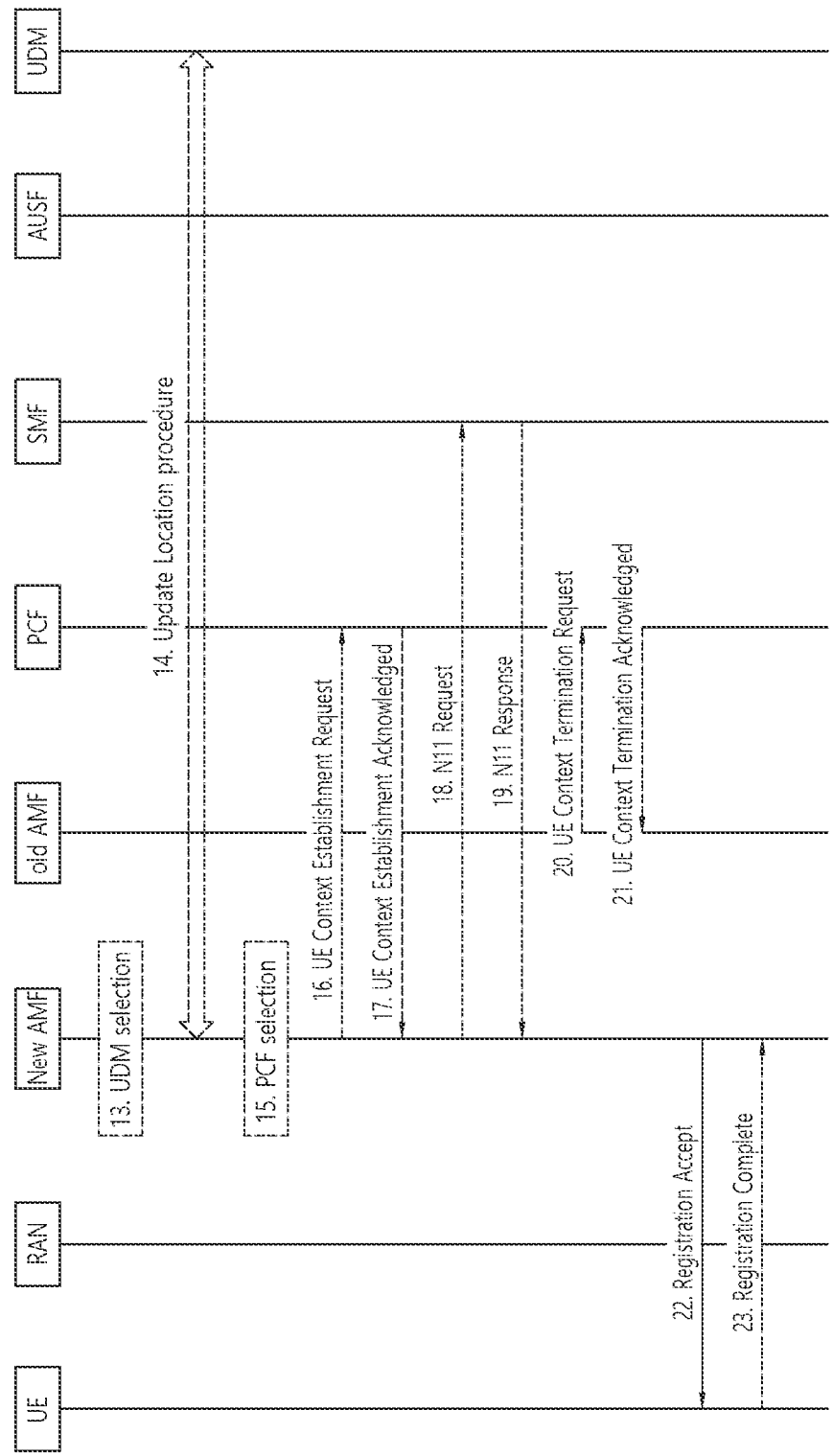

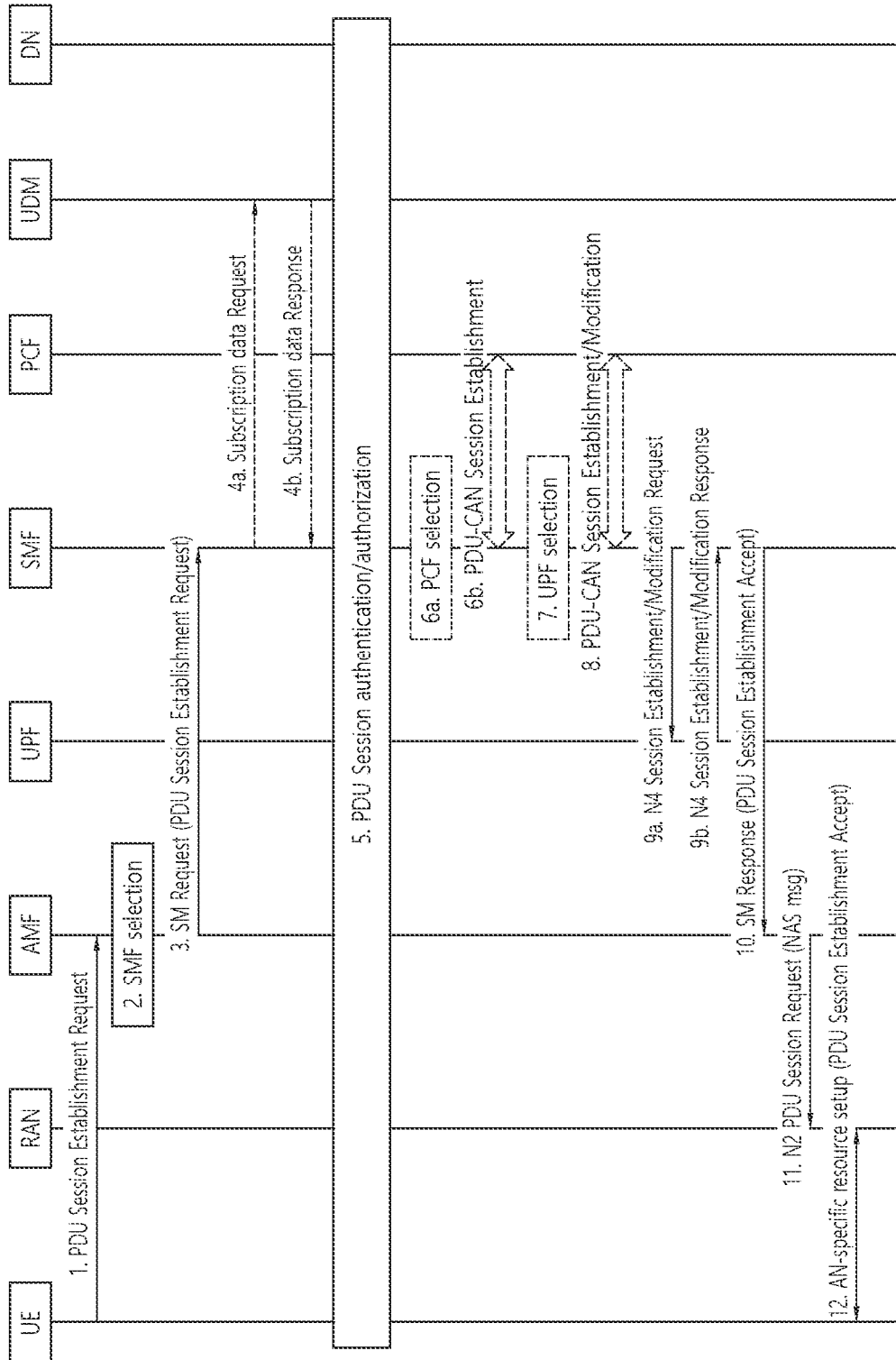

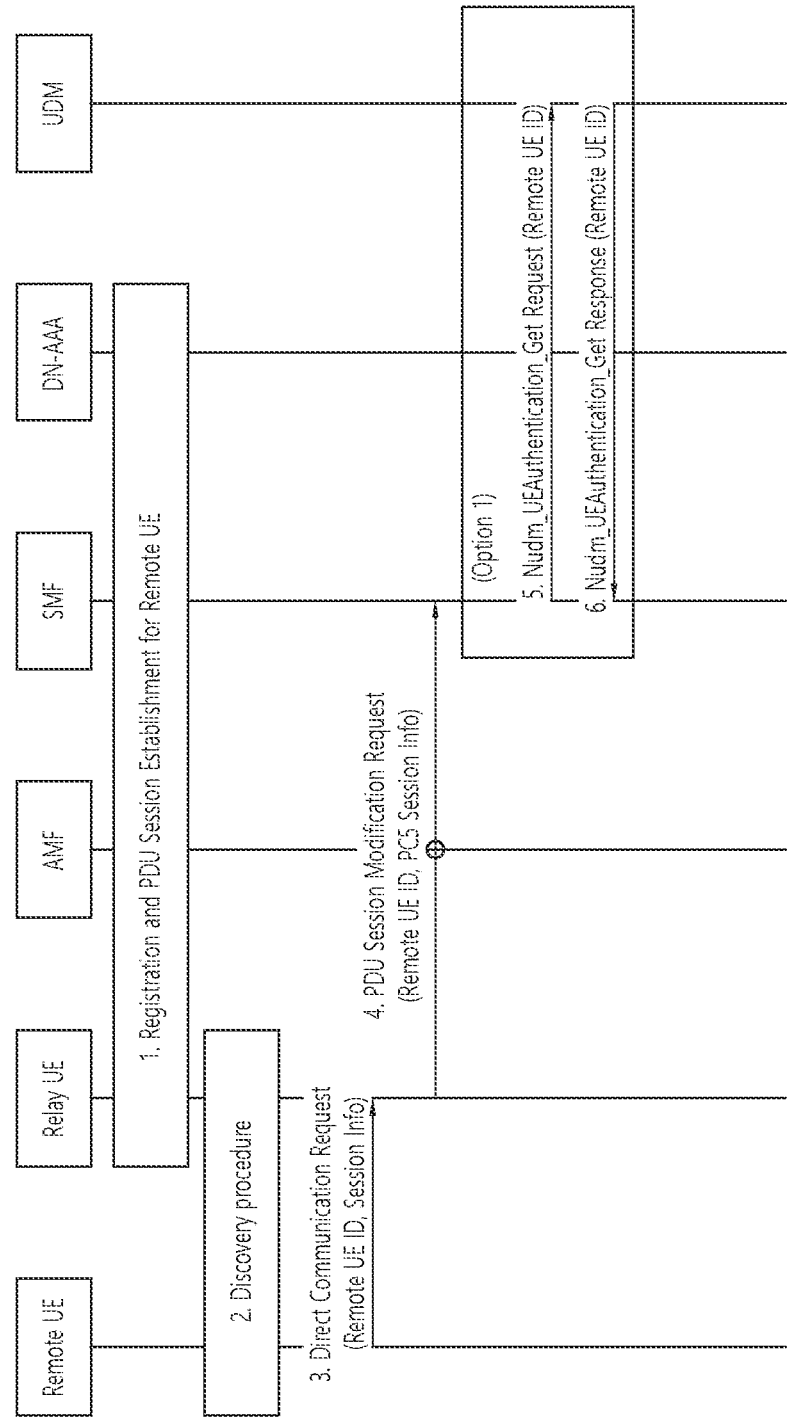

AUTHENTICATION FOR RELAY

CROSS-REFERENCE TO RELATED APPLICATIONS

This application is a National Stage application under 35 U.S.C. § 371 of International Application No. PCT/KR2020/011013, filed on Aug. 19, 2020, which claims the benefit of Korean Patent Application No. 10-2019-0100936, filed on Aug. 19, 2019, Korean Patent Application No. 10-2020-0001613, filed on Jan. 6, 2020, and Korean Patent Application No. 10-2020-0059996, filed on May 19, 2020. The disclosures of the prior applications are incorporated by reference in their entirety.

TECHNICAL FIELD

The present specification generally relates to mobile communication.

BACKGROUND

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

For the fifth-generation (so called 5G) mobile communication, a new radio access technology (New RAT or NR) have been studied and researched.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

One of the newly added functions in the 5G network is secondary authentication/authorization. In the 5G network, in the procedure for the terminal to establish a PDU session, when secondary authentication/authorization with the Data Network-Authentication, Authorization, Accounting (DN-AAA) server is required, the 5G network may perform an authentication procedure with the terminal. And, according to the result of the performed authentication procedure, the network may determine whether to allow the establishment of the PDU session of the terminal. This secondary authentication/authorization process may be performed using a NAS message between the terminal and the SMF.

On the other hand, when the terminal (eg, Remote User Equipment (UE)) is connected to the 5G network through the relay UE through the L3 relay, the 5G network and/or the DN-AAA server cannot transmit and receive NAS message with the terminal (eg, Remote UE). In other words, when a terminal (eg, Remote UE) is connected to a Relay UE through an L3 relay, it is because the terminal (eg, Remote UE) cannot transmit a NAS message to the Relay UE or cannot receive the NAS message from the terminal (eg, Remote UE). Therefore, the 5G network and/or the DN-AAA server cannot perform secondary authentication/authorization for the PDU session of the terminal (eg, Remote User Equipment (UE)).

In order to solve this problem, it is necessary to discuss a method for supporting authentication and/or secondary authentication/authorization for a terminal (eg, Remote UE) that cannot transmit and receive NAS messages with the network.

SUMMARY

Accordingly, a disclosure of the present specification has been made in an effort to solve the aforementioned problem.

In order to solve the above problems, one disclosure of the present specification provides a method for an SMF node to perform authentication. The method may include: receiving, from a relay UE, a Remote UE report message related to a Remote UE connected to the relay UE; transmitting a request message to a UDM node or an AMF node based on the Remote UE report message including the SUCI of the Remote UE; receiving a response message including the SUPI of the Remote UE from the UDM node or the AMF node; and transmitting an authentication request message requesting authentication for the Remote UE to an authentication server.

In order to solve the above problems, one disclosure of the present specification provides a method for a relay UE to perform authentication. The method may include: receiving a communication request message directly from a Remote UE; transmitting a Remote UE report message to the SMF node; and receiving a message including an authentication result for the Remote UE from the SMF.

In order to solve the above problems, one disclosure of the present specification may provide an SMF node that performs authentication. The SMF node includes at least one processor; and at least one memory that stores instructions and is operably electrically connectable with the at least one processor, wherein the instructions are executed based on execution by the at least one processor. The operations may include: receiving, from a relay UE, a Remote UE report message related to a Remote UE connected to the relay UE; transmitting a request message to a UDM node or an AMF node based on the Remote UE report message including the SUCI of the Remote UE; receiving a response message including the SUPI of the Remote UE from the UDM node or the AMF node; and transmitting an authentication request message requesting authentication for the Remote UE to an authentication server.

In order to solve the above problems, one disclosure of the present specification may provide a relay UE that performs authentication. The relay UE includes at least one processor; and at least one memory that stores instructions and is operably electrically connectable with the at least one processor, wherein the instructions are executed based on execution by the at least one processor. The operation may include: receiving a communication request message directly from the Remote UE; transmitting a Remote UE report message to the SMF node; and receiving a message including an authentication result for the Remote UE from the SMF.

In order to solve the above problems, one disclosure of the present specification may provide an apparatus in mobile communication. The apparatus includes at least one processor; and at least one memory that stores instructions and is operably electrically connectable with the at least one processor, wherein the instructions are executed based on execution by the at least one processor. The operations may include: identifying a direct communication request message received from the Remote UE; generating a Remote UE report message; and identifying a message including an authentication result for the Remote UE received from the SMF node.

In order to solve the above problems, one disclosure of the present specification may provide a non-volatile computer-readable storage medium recording instructions. The instructions, when executed by one or more processors, may cause the one or more processors to: identify a direct communication request message received from a Remote UE; generating a Remote UE report message; and identifying a message including an authentication result for the Remote UE received from the SMF node.

Accordingly, a disclosure of the present specification has been made in an effort to solve the aforementioned problem.

Effects that can be obtained through specific examples of the present specification are not limited to the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIGS. 5a and 5b are signal flow charts showing an exemplary registration procedure.

FIGS. 6a and 6b is a signal flowchart illustrating an exemplary PDU session establishment procedure.

FIGS. 11a to 11c show a signal flow diagram according to an example of the second disclosure of the present specification.

DESCRIPTION OF EXEMPLARY EMBODIMENTS

Figure 1:
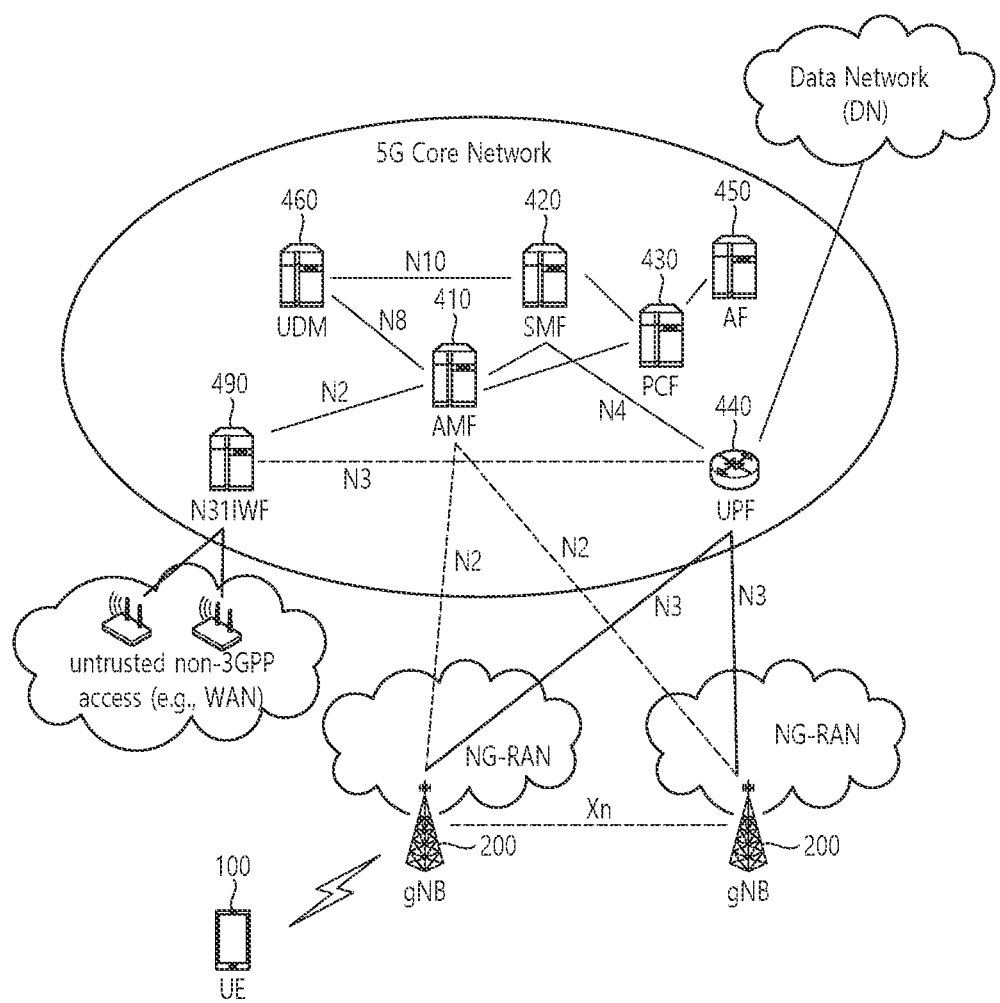
FIG. 1 is a structural diagram of a next-generation mobile communication network.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

As used herein, "A or B" may mean "only A", "only B", or "both A and B". In other words, "A or B" herein may be understood as "A and/or B". For example, "A, B or C" herein means "only A", "only B", "only C", or any combination of A, B and C (any combination of A, B and C)".

As used herein, a slash (/) or a comma may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, the expression "at least one of A or B" or "at least one of A and/or B" may be understood as "At least one of A and B".

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C".

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDDCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

In the accompanying drawings, a user equipment (UE) is illustrated by way of example, but the illustrated UE may also be referred to in terms of UE 100 (terminal), mobile equipment (ME), and the like. In addition, the UE may be a portable device such as a notebook computer, a mobile phone, a PDA, a smartphone, or a multimedia device or may be a non-portable device such as a PC or vehicle-mounted device.

Hereinafter, the UE is used as an example of a wireless communication device (or a wireless device, or a wireless device) capable of wireless communication. An operation performed by the UE may be performed by a wireless communication device. A wireless communication device may also be referred to as a wireless device, a wireless device, or the like. Hereinafter, AMF may mean an AMF node, SMF may mean an SMF node, and UPF may mean a UPF node.

A base station, a term used below, generally refers to a fixed station that communicates with a wireless device, and may be called other terms such as an evolved-NodeB (eNodeB), an evolved-NodeB (eNB), a BTS (Base Transceiver System), an access point (Access Point) and gNB (Next generation NodeB).

I. Techniques and procedures applicable to the disclosure of the present specification FIG. 1 is a structural diagram of a next-generation mobile communication network.

5GC (5G Core) may include various components, part of which are shown in FIG. 1, including an access and mobility management function (AMF) 410, a session management function (SMF) 420, a policy control function (PCF) 430, a User Plane Function (UPF) 44, an application function (AF) 450, a unified data management (UDM) data network 460, and a non-3GPP interworking function (N3IWF) 490.

A UE 100 is connected to a data network via the UPF 440 through a Next Generation Radio Access Network (NG-RAN) including the gNB 20.

The UE 100 may be provided with a data service even through untrusted non-3GPP access, e.g., a wireless local area network (WLAN). In order to connect the non-3GPP access to a core network, the N3IWF 490 may be deployed.

The illustrated N3IWF 490 performs a function of managing interworking between the non-3GPP access and the 5G system. When the UE 100 is connected to non-3GPP access (e.g., WiFi referred to as IEEE 801.11), the UE 100 may be connected to the 5G system through the N3IWF 490. The N3IWF 490 performs control signaling with the AMF 410 and is connected to the UPF 440 through an N3 interface for data transmission.

The illustrated AMF 410 may manage access and mobility in the 5G system. The AMF 410 may perform a function of managing Non-Access Stratum (NAS) security. The AMF 410 may perform a function of handling mobility in an idle state.

The illustrated UPF 440 is a type of gateway through which user data is transmitted/received. The UPF 440 may perform the entirety or a portion of a user plane function of a serving gateway (S-GW) and a packet data network gateway (P-GW) of 4G mobile communication.

The UPF 440 operates as a boundary point between a next generation radio access network (NG-RAN) and the core network and maintains a data path between the gNB 20 and the SMF 420. In addition, when the UE 100 moves over an area served by the gNB 20, the UPF 440 serves as a mobility anchor point. The UPF 440 may perform a function of handling a PDU. For mobility within the NG-RAN (which is defined after 3GPP Release-15), the UPF 440 may route packets. In addition, the UPF 540 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 44 may correspond to a termination point of a data interface toward the data network.

The illustrated PCF 430 is a node that controls an operator's policy.

The illustrated AF 450 is a server for providing various services to the UE 100.

The illustrated UDM 460 is a kind of server that manages subscriber information, such as home subscriber server (HSS) of 4G mobile communication. The UDM 460 stores and manages the subscriber information in a unified data repository (UDR).

The illustrated SMF 420 may perform a function of allocating an Internet protocol (IP) address of the UE. In addition, the SMF may control a protocol data unit (PDU) session.

For reference, hereinafter, reference numerals for AMF (410), SMF (420), PCF (430), UPF (440), AF (450), UDM (460), N3IWF (490), gNB (20), or UE (100) may be omitted.

The $5^{th}$ generation mobile communcation supports a plurality of numerologies (e.g. a plurality of values of subcarrier spacing (SCS)) in order to support various services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

The NR frequency band is defined as two types of frequency ranges (FR1, FR2). FR1 is 410 MHz-7125 MHz, and FR2 is 24250 MHz-52600 MHz, which may mean millimeter wave (mmW). For convenience of explanation, among the frequency ranges used in the NR system, FR1 may mean "sub 6 GHz range" and FR2 may mean "above 6 GHz range" and may be called millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or higher included in FR1 may include an unlicensed band. The unlicensed band may be used for various purposes, for example, for communication for a vehicle (eg, autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
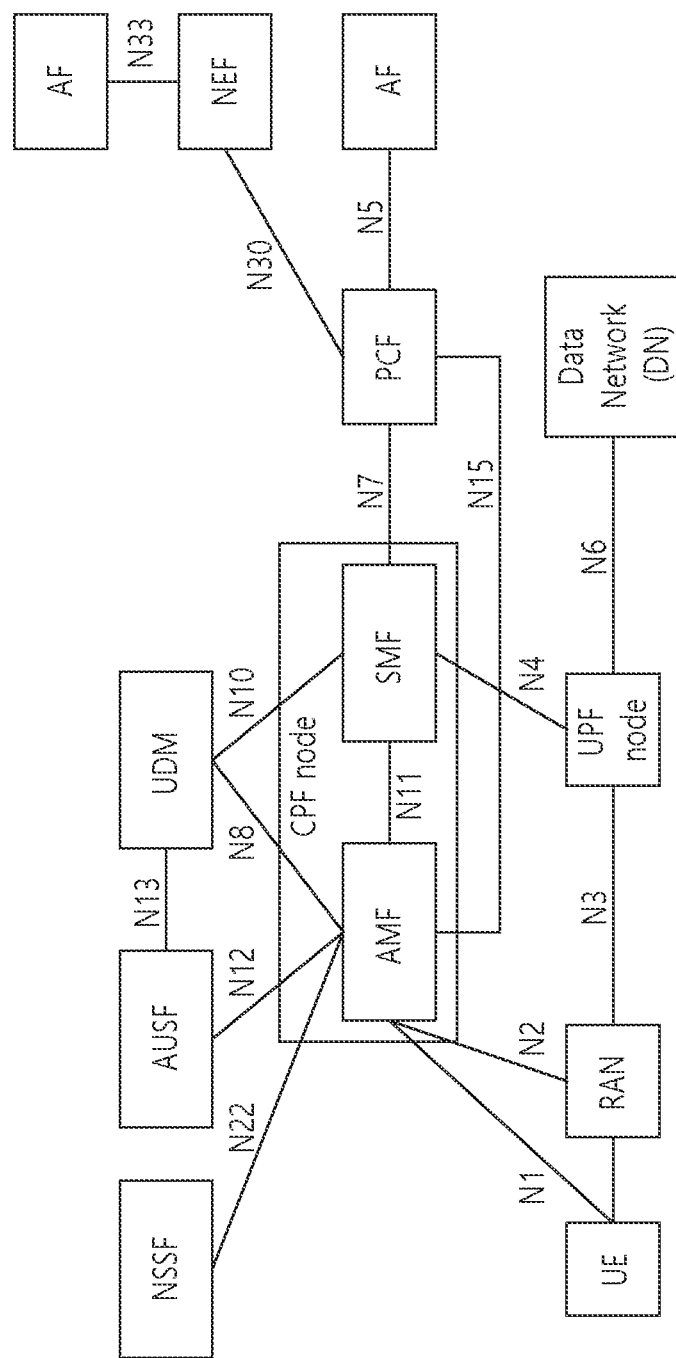
FIG. 2 is an exemplary diagram illustrating a predicted structure of a next generation mobile communication in terms of a node.

FIG. 2 is an exemplary diagram illustrating a predicted structure of a next generation mobile communication in terms of a node.

Referring to FIG. 2, the UE is connected to a data network (DN) through a next generation RAN (Radio Access Network).

The Control Plane Function (CPF) node shown in FIG. 2 may perform all or part of the Mobility Management Entity (MME) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the drawing is a type of a gateway over which user data is transmitted and received. The UPF node may perform all or part of the user plane functions of the S-GW and the P-GW of the fourth generation mobile communication.

The Policy Control Function (PCF) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

The illustrated Network Exposure Function (NEF) is a node for providing a mechanism to securely expose services and functions of the 5G core. For example, NEF exposes functions and events, securely provides information from external applications to the 3GPP network, translates internal/external information, provides control plane parameters, and manages packet flow description (PFD).

Figure 3:
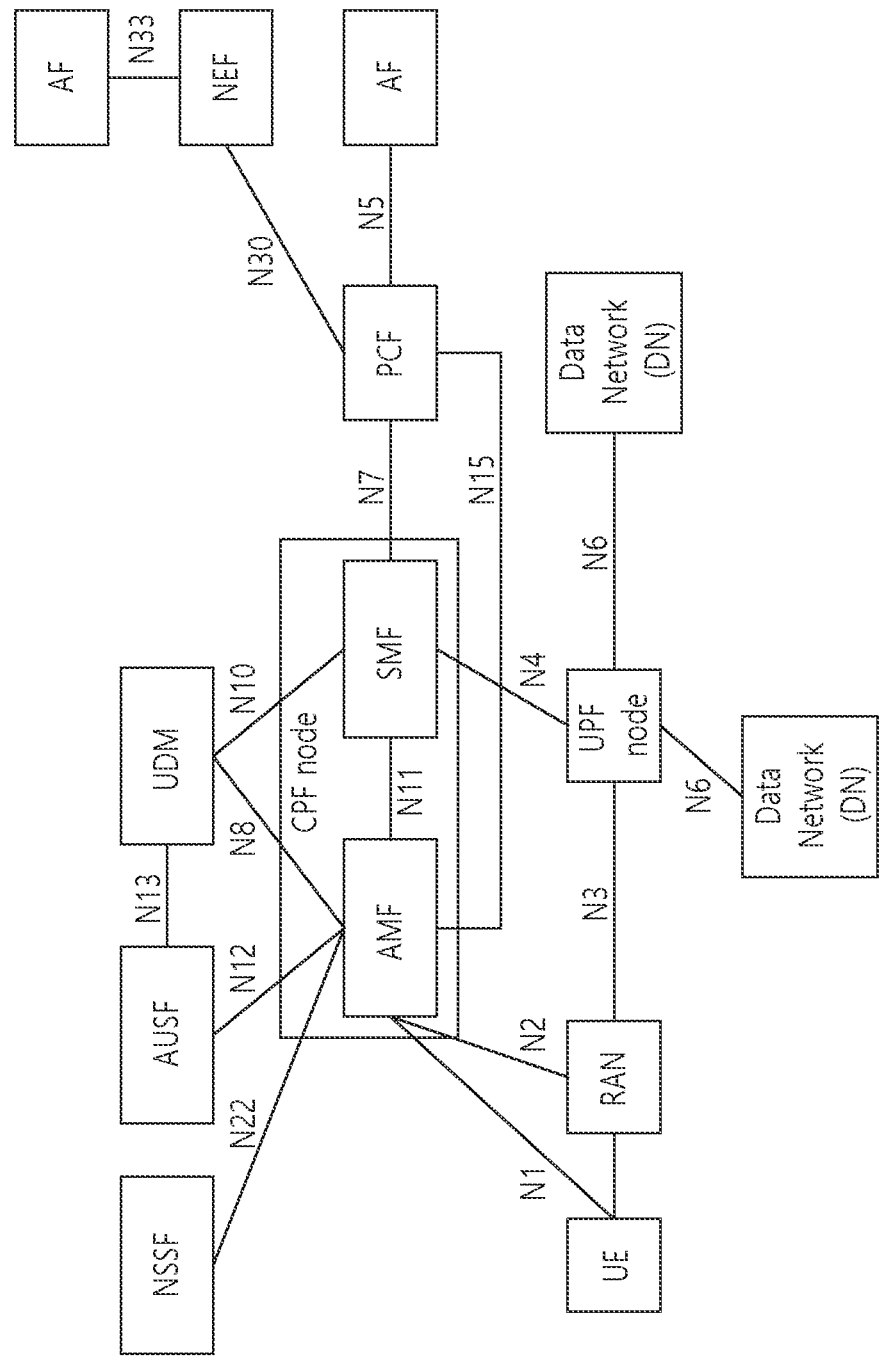
FIG. 3 illustrates an architecture that allows the UE to simultaneously access two data networks using one PDU session.

In FIG. 3, the UE may simultaneously access two data networks using multiple PDU sessions.

FIG. 3 illustrates an architecture that allows the UE to simultaneously access two data networks using one PDU session.

FIG. 3 illustrates an architecture that allows the UE to simultaneously access two data networks using one PDU session.

For reference, descriptions of the reference points shown in FIGS. 2 and 3 are as follows.

N1 represents Reference point between UE and AMF.
N2 represents Reference point between NG-RAN and AMF.
N3 represents Reference point between NG-RAN and UPF.
N4 represents Reference point between SMF and UPF.
N5 represents Reference point between PCF and AF.
N6 represents Reference point between UPF and DN.
N7 represents Reference point between SMF and PCF.
N8 represents Reference point between UDM and AMF.
N9 represents Reference point between UPFs.
N10 represents Reference point between UDM and SMF.
N11 represents Reference point between AMF and SMF.
N12 represents Reference point between AMF and AUSF.
N13 represents Reference point between UDM and AUSF.
N14 represents Reference point between AMFs.
N15 represents Reference point between PCF and AMF in a non-roaming scenario and reference point between AMF and PCF of visited network in roaming scenario.
N16 represents Reference point between SMFs.
N22 represents Reference point between AMF and NSSF.
N30 represents Reference point between PCF and NEF.
N33 represents Reference point between AF and NEF.

In FIGS. 2 and 3, AF by a third party other than an operator may be connected to 5GC through a network exposure function (NEF).

Figure 4:
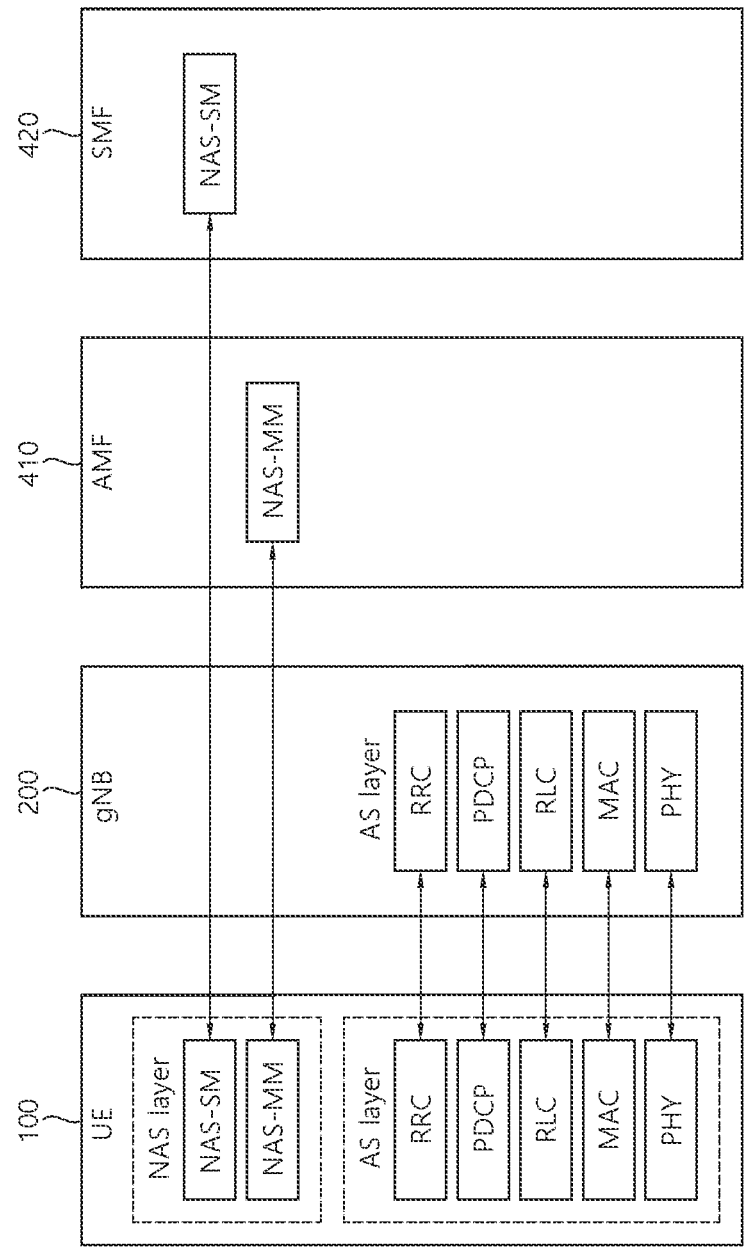
FIG. 4 is another exemplary diagram showing a structure of a radio interface protocol between a UE and a gNB.

FIG. 4 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS entity for MM provides the following functions in general.

NAS procedures related to AMF include the following.
Registration management and access management procedures. AMF supports the following functions.
Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,

The NAS entity for the MM creates a NAS-MM message that derives how and where to deliver an SM signaling message through a security header representing the NAS transmission of SM signaling and additional information on a received NAS-MM.

Upon receiving SM signaling, the NAS entity for the SM performs an integrity check of the NAS-MM message, analyzes additional information, and derives a method and place to derive the SM signaling message.

Meanwhile, in FIG. 4, the RRC layer, the RLC layer, the MAC layer, and the PHY layer located below the NAS layer are collectively referred to as an access stratum (AS).

A network system (ie, 5GC) for next-generation mobile communication (ie, 5G) also supports non-3GPP access. An example of the non-3GPP access is typically a WLAN access. The WLAN access may include both a trusted WLAN and an untrusted WLAN.

In the system for 5G, AMF performs registration management (RM: Registration Management) and connection management (CM: Connection Management) for 3GPP access as well as non-3GPP access.

A Multi-Access (MA) PDU session using both 3GPP access and non-3GPP access may be used.

The MA PDU session is a PDU session that can be serviced simultaneously with 3GPP access and non-3GPP access using one PDU session.

Figure 5A:
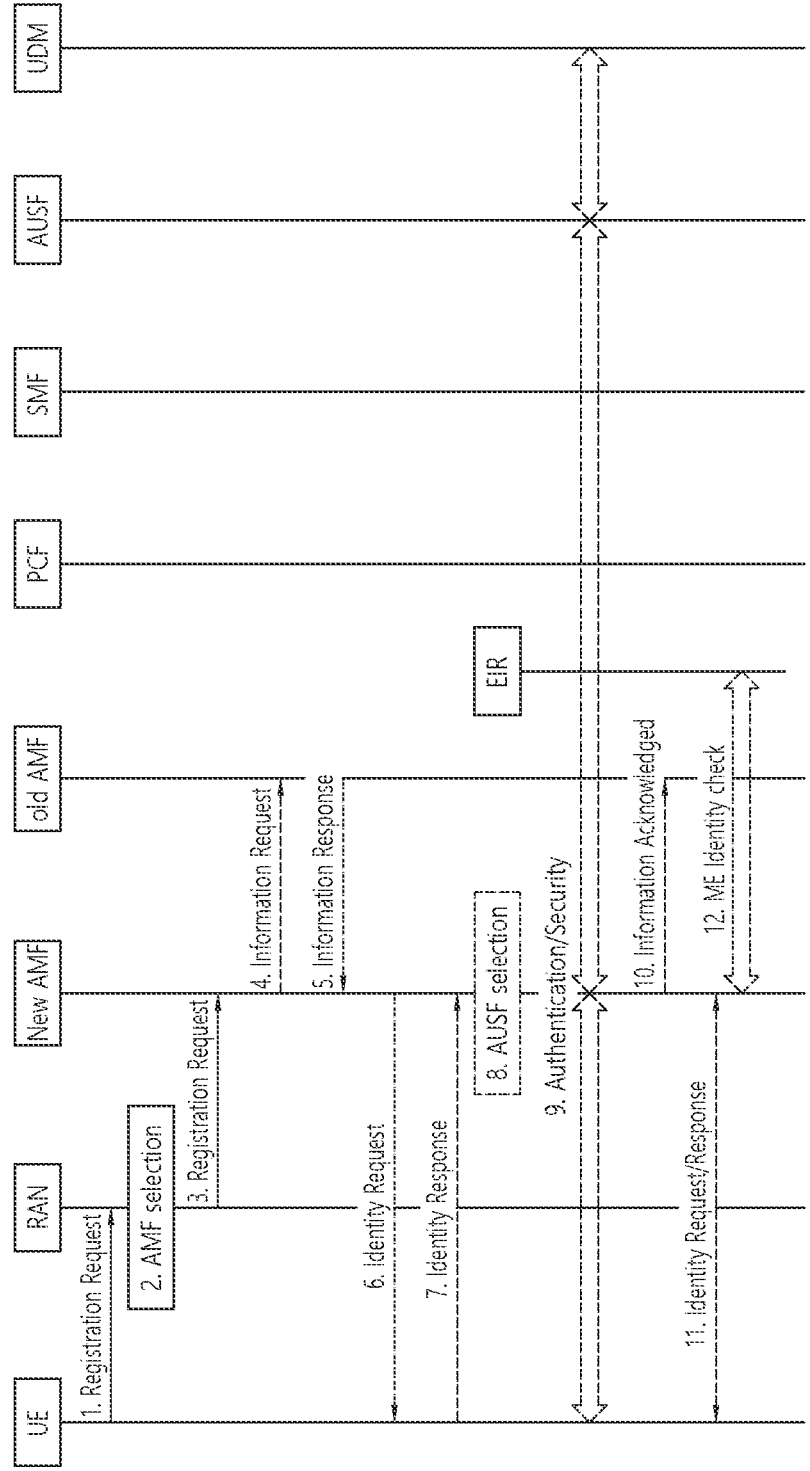

FIGS. 5a and 5b are signal flow charts showing an exemplary registration procedure.

1) The UE may transmit an AN message to the RAN. The AN message may include an AN parameter and a registration request message. The registration request message may include information, such as a register type, a subscriber permanent ID or temporary user ID, a security parameter, NASSAI, 5G capability of the UE, a PDU session status, and so on.

In case of a 5G RAN, the AN parameter may include a SUPI or a temporary user ID, a selected network, and NASSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a PLMN other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information of the allowed NSSAI and the mapped NSSAI. The allowed NSSAI information for the access type of the UE may be included in the N2 message including the registration accept message. The information of the mapped NSSAI is information that maps each S-NSSAI of the allowed NSSAI to the S-NASSI of the NSSAI configured for Home Public Land Mobile Network (HPLMN).

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<PDU Session Establishment Procedure>

For the PDU Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 6B:
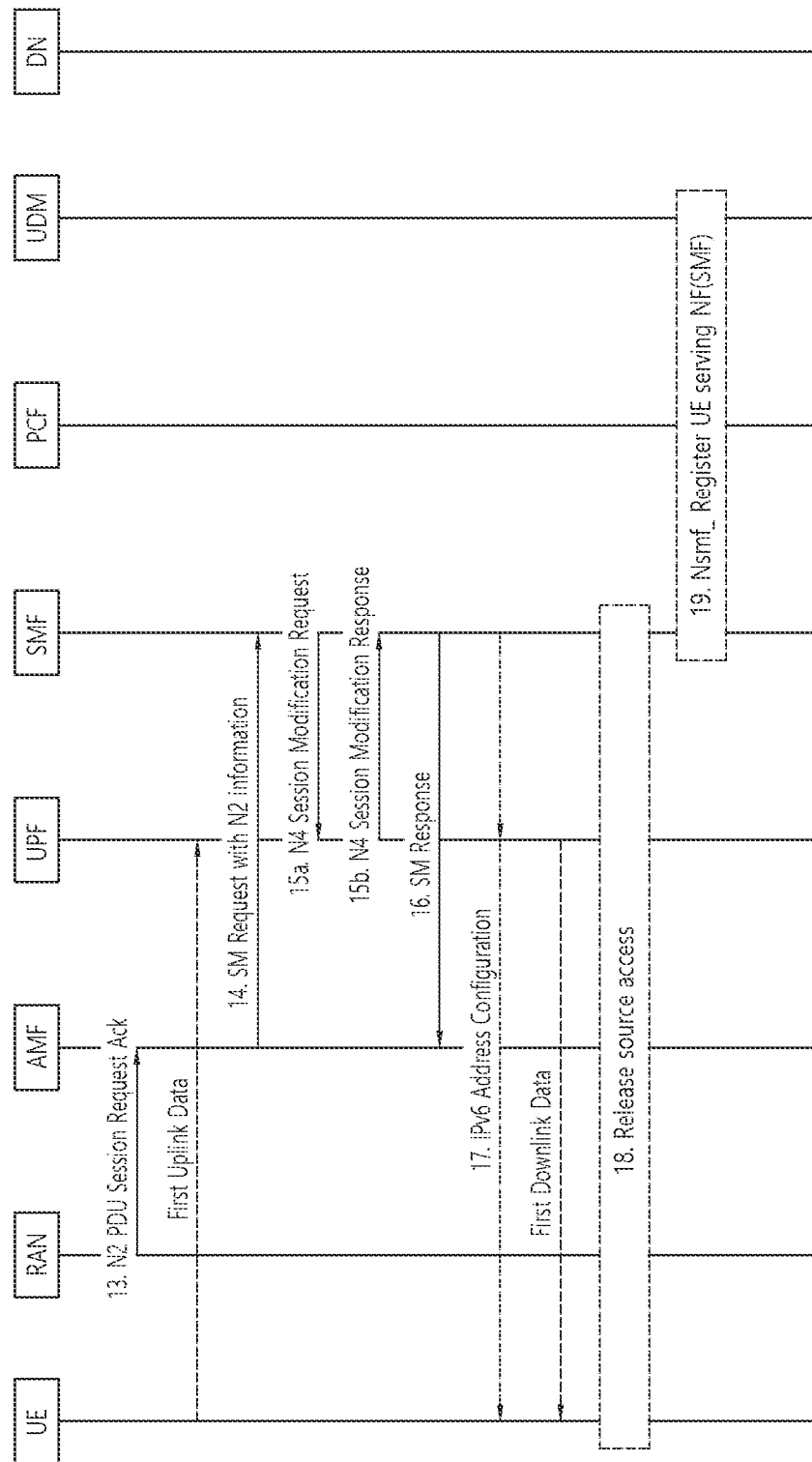

FIGS. 6a and 6b are a signal flowchart illustrating an exemplary PDU session establishment procedure.

The procedure shown in FIGS. 6a and 6b assumes that the UE has already registered on the AMF according to the registration procedure shown in FIGS. 5a and 5b. Therefore, it is assumed that the AMF has already acquired user subscription data from UDM.

1) The UE transmits a NAS message to the AMF. The message may include Single-Network Slice Selection Assistance Information (S-NSSAI), DNN, PDU session ID, a Request type, N1 SM information (including PDU Session Request), and so on.

Specifically, the UE includes the S-NSSAI from the allowed (allowed) NSSAI of the current access type. If information on the mapped NSSAI is provided to the UE, the UE may provide both the S-NSSAI based on the allowed NSSAI and the corresponding S-NSSAI based on the information of the mapped NSSAI. Here, the mapped NSSAI information is information that maps each S-NSSAI of the allowed NSSAI to the S-NASSI of the NSSAI configured for HPLMN.

More specifically, The UE may extract and store the information of the allowed S-NSSAI and the mapped S-NSSAI included in the registration accept message received from the network (ie, AMF) in the registration procedure of FIGS. 5a and 5b. Accordingly, the UE may transmit the PDU session establishment request message by including both the S-NSSAI based on the allowed NSSAI and the corresponding S-NSSAI based on the mapped NSSAI information.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The SM request message may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE. The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UPF.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic PCC is distributed, the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of Process 3 indicates an "initial request", the SMF selects an SSC mode for the PDU session. If Process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case Process 5 is not performed, the SMF may use the selected UPF and start an N4 Session Establishment procedure. And, otherwise, the SMF may use the selected and start an N4 Session Modification procedure.

9a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message. The PDU Session Establishment Accept message may include an allowed QoS rule, an SSC mode, S-NSSAI, and allocated IPv4 address.

As information that shall be forwarded to the RAN by the AMF, the N2 SM information may include the following.

CN Tunnel information: This corresponds to a core network address of an N3 tunnel corresponding to the PDU session.

QoS Profile: This is used for providing mapping between a QoS parameter and a QoS flow identifier (QFI) to the RAN.

PDU Session ID: This may be used for indicating a relation between AN resources for the UE and the PDU session to the UE via AN signaling for the UE.

Meanwhile, the N1 SM information includes a PDU Session Establishment Accept message that shall be provided to the UE by the AMF.

Multiple QoS rules may be included in the N1 SM information and the N2 SM information within the PDU Session Establishment Accept message.

The SM response message also includes information enabling the PDU session ID and AMF to determine not only which target UE to use but also which access is to be used for the UE.

11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in Process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/ Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPv6, the SMF may generate an IPv6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF releases the user plane through a source access (3GPP or non-3GPP access).

19) In case the ID of the SMF is not included in Process 4b by the UDM of the DNN subscription context, the SMF may call (or page or summon) a "UDM_Register UE serving NF service" including an SMF address and DNN. The UDM may store the ID, address, and DNN of the SMF.

During the procedure, if the PDU Session Establishment is not successful, the SMF notifies this to the AMF.

<Device to Device (D2D) Communication>

On the other hand, hereinafter, D2D communication will be described.

Figure 7:
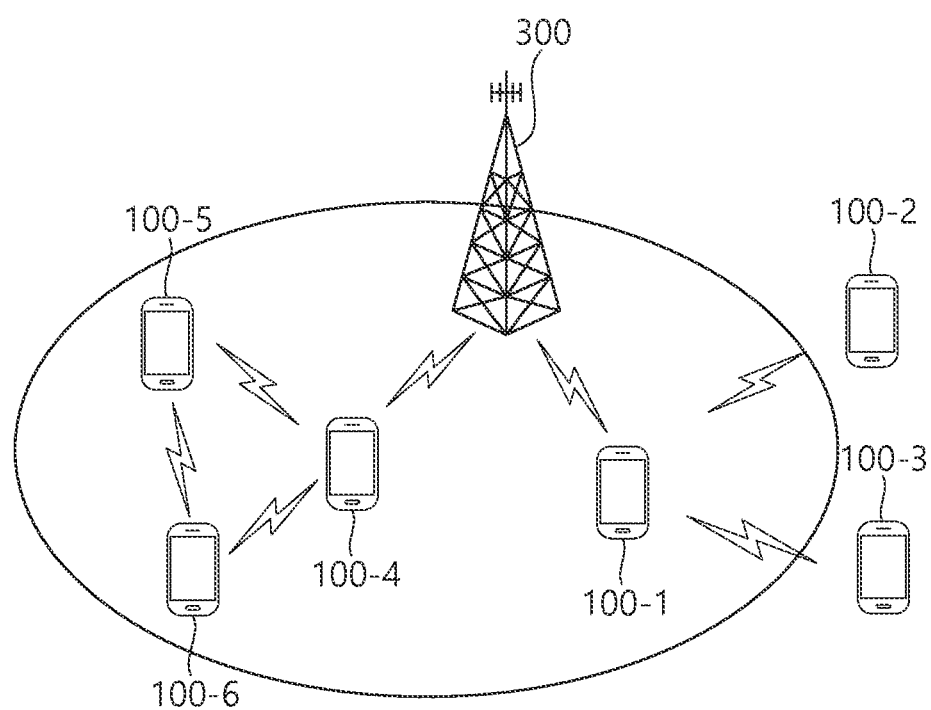
FIG. 7 shows an example of a concept of Device to Device (D2D) communication.

FIG. 7 shows an example of a concept of Device to Device (D2D) communication.

Due to an increase in user requirements for a Social Network Service (SNS), communication between UEs at a physically close distance, i.e., Device to Device (D2D) communication, is required.

In order to reflect the above requirements, as shown in FIG. 7, between UE #1 100-1, UE #2 100-2, UE #3 100-3 or between UE #4 100-4, UE #5 100-5, UE #6 100-6, a method for directly communicating without intervention of a base station (eNodeB) 200 is being discussed. Of course, it is possible to communicate directly between the UE #1 100-1 and the UE #4 100-4 with the help of the base station (gNB) 300. Meanwhile, UE #4 100-4 may serve as a relay for UE #5 100-5 and UE #6 100-6. Similarly, UE #1 100-1 may serve as a repeater for UE #2 100-2 and UE #3 100-3 that are far away from the cell center.

On the other hand, D2D communication is also called a Proximity Service (ProSe). In addition, a UE performing a proximity service is also referred to as a ProSe UE. A link between UEs used for the D2D communication is also called a sidelink.

The physical channels used for the sidelink include the following.

Physical Sidelink Shared Channel (PSSCH)
Physical Sidelink Control Channel (PSSCH)
Physical Sidelink Discovery Channel (PSDCH)
Physical Sidelink Broadcast Channel (PSBCH)

In addition, there are the following physical signals used in the sidelink.

Demodulation Reference signal (DMRS)
Sidelink Synchronization signal (SLSS)

The SLSS includes a Primary Sidelink Synchronization Signal (PSLSS) and a Secondary Sidelink Synchronization Signal (SSLSS).

Figure 8:
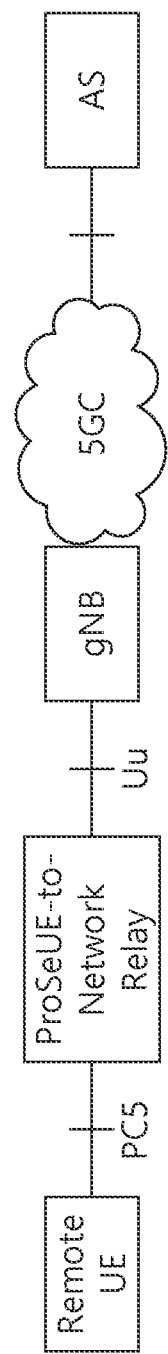
FIG. 8 shows an example of an architecture of a UE-to-Network Relay.
Figure 9:
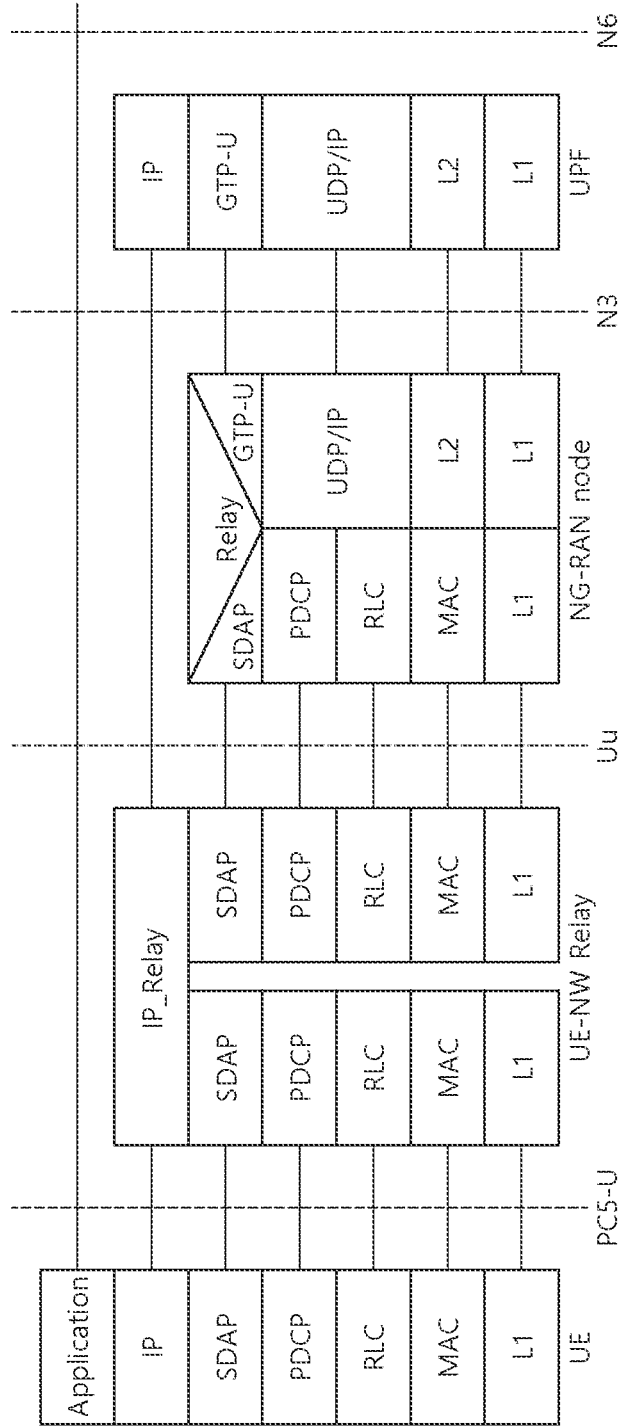
FIG. 9 shows an example of a protocol stack for UE-to-Network Relay.

FIG. 8 shows an example of an architecture of a UE-to-Network Relay. FIG. 9 shows an example of a protocol stack for UE-to-Network Relay.

Referring to FIG. 8, UE-to-Network Relay supports the network connection of the remote UE.

The PC5 link is the interface between the UE and the UE-to-Network Relay. The Uu link is the interface between the UE-to-Network Relay and the base station.

If the UE has established a PC5 link with the UE-to-Network Relay, the UE is considered a remote UE.

The 5G ProSe UE-to-Network Relay entity (refer to 5G ProSe UE-to-Network Relay in FIG. 8) may provide a function for supporting network connectivity for Remote UEs. UE-to-Network Relay may be used for both public safety services and commercial services (eg, interactive services).

When a UE (eg Remote UE) has successfully established a PC5 link to a 5G ProSe UE-to-Network Relay, the UE (eg Remote UE) may be considered as a Remote UE for a specific 5G ProSe UE-to-Network Relay. The Remote UE may be located within NG-RAN coverage or may be located outside NG-RAN coverage.

5G ProSe UE-to-Network Relay may relay unicast traffic (UL and DL traffic) between the Remote UE and the network. The 5G ProSe UE-to-Network Relay shall provide a general function to relay all IP traffic.

For unicast traffic between Remote UEs and 5G ProSe UE-to-Network Relays, One-to-one Direct Communication may be used. The protocol stack of FIG. 9 described above may be a protocol stack for Layer-3 UE-to-Network Relay.

Hop-by-hop security can be supported on PC5 links and Uu links. If there is a requirement beyond hop-by-hop security to protect the traffic of the Remote UE, security through the IP layer may be applied.

In this case, when the remote UE maintains both the PC5 link and the Uu link, the network core entity connected to the Uu link may not be aware of the existence of the PC5 link toward the UE-to-Network Relay.

Communication between the remote UE and the UE-to-Network Relay is performed as one-to-one direct communication.

<Secondary Authentication/Authorization>

While the PDU session establishment procedure is being performed, the Data Network-Authentication, Authorization, and Accounting (DN-AAA) server may perform secondary authentication/authentication. Here, the secondary authentication/authorization may mean authentication/authorization through a data network (DN) outside the domain of the mobile operator. A DN-AAA server may belong to 5GC or DN.

When the procedure for establishing a PDU session to the Data Network (DN) is performed, the following operations may be performed:

The DN-specific identity of the UE can be authenticated/authorized by the DN.

During the PDU session establishment procedure, when the UE provides authentication/authorization information corresponding to the DN-specific identity, and the SMF determines that authentication/authorization of the PDU session establishment is required based on the SMF policy related to the DN, the SMF may deliver the authentication/authorization information of the UE to the DN-AAA server. For example, when the DN-AAA server is located in the DN, the SMF may deliver authentication/authorization information of the UE to the DN-AAA server through the UPF. When the DN-AAA server is located in 5GC and the SMF can communicate directly with the DN-AAA server, the SMF may transmit the authentication/authorization information of the UE to the DN-AAA server without the intervention of the UPF. If the SMF determines that authentication of PDU session establishment is necessary, but the UE did not provide authentication/authorization information, the SMF may reject PDU session establishment.

The DN-AAA server may authenticate/authorize PDU session establishment.

When the DN-AAA server authorizes PDU session establishment, the DN-AAA server may transmit DN Authorization Data for the established PDU session to the SMF. The DN authorization data for the established PDU session may include one or more of the following information:

a) DN Authorization Profile Index related to authentication for policy and charging control (policy and charging control) configured locally within the SMF or PCF.

b) List of allowed Media Access Control (MAC) addresses for PDU sessions (this list is only applicable for PDU sessions of Ethernet PDU type).

c) List of VLAN IDs (VIDs) allowed for PDU session (this list is applicable only for PDU sessions of Ethernet PDU type).

d) DN authorized Session Aggregate Maximum Bit Rate (AMBR) for PDU sessions. DN authorized Session AMBR for PDU session may take precedence over subscribed Session-AMBR received from UDM.

d) a list of Framed Routes for the PDU Session

SMF policy may require DN authorization (authorization) without DN authentication (authentication). In this case, when the SMF connects to the DN-AAA server for authorization, the SMF may provide the UE's Generic Public Subscription Identifier (GPSI) to the DN-AAA server, if possible.

This DN authentication/authorization may be performed for the purpose of PDU session authorization, with the following procedures:

5GC access authentication handled by AMF.

PDU session authorization performed by the SMF in relation to the subscription data obtained from the UDM.

Based on the local policy, the SMF may initiate DN authentication/authorization in the PDU session establishment procedure. During the DN authorization/authentication procedure, the SMF may provide the GPSI to the DN-AAA server through signaling exchanged with the DN-AAA server, if possible.

After successful DN authentication/authentication, a PDU session may be maintained between the SMF and the DN-AAA server.

The UE may provide information necessary to support user authentication performed by the DN through NAS Session Management (SM).

If the SMF adds a PDU session anchor to the PDU session, DN authorization/authentication is not performed. However, when a new prefix or address is added to a PDU session, when a new prefix or address is removed from a PDU session, or when N6 traffic routing information is changed for a PDU session, the SMF policy may require the SMF to notify the DN.

When the SMF is notified of the addition or removal of the MAC address for the PDU session from the UPF, the SMF policy may require the SMF to notify the DN-AAA server.

When the SMF rejects establishment of the PDU session, the SMF may transmit a PDU session establishment rejection indication (or information) to the UE via the NAS SM.

When the DN-AAA server transmits DN Authorization Data for the authorized PDU Session to the SMF, and dynamic Policy and Charging Control (PCC) is deployed, the SMF may transmit the DN authorized Session AMBR and/or DN Authorization Profile Index in the DN authorization data for the PDU session to the PCF.

If the DN-AAA transmits the DN Authorization Profile Index in the DN Authorization Data to the SMF and the dynamic PCC is not deployed, the SMF may refer to locally set information using the DN Authorization Profile Index.

The DN Authorization Profile Index can be regarded as an index negotiated in advance between the operator and the administrator of the DN-AAA server.

If the DN-AAA server does not transmit DN authorization data for an authenticated PDU session, the SMF may use locally configured information.

The DN-AAA server may revoke authentication for a PDU session or update DN authorization data for a PDU session at any time. According to the request from the DN-AAA server, the SMF may release or update the PDU session.

The DN-AAA server or SMF may trigger a secondary re-authentication procedure for a PDU session established with secondary authentication at any time.

During the secondary re-authentication/re-authorization procedure, if the SMF receives the DN authorized Session AMBR and/or DN Authorization Profile Index from the DN-AAA server, the SMF may report the received value to the PCF.

II. Problems to be Solved by the Disclosure of this Specification

One of the newly added functions in the 5G network is secondary authentication/authorization. In the 5G network, when the UE needs secondary authentication/authorization with the DN-AAA server in the procedure for establishing the PDU session, the 5G network may perform an authentication procedure with the terminal. And, according to the result of the performed authentication procedure, the network may determine whether to allow establishment of the PDU session. If authentication fails, the network may reject the PDU session establishment request. If authentication is successful, the network may accept the PDU session establishment request.

This secondary authentication/authorization process may be performed using a NAS message between the terminal and the SMF.

When the Remote UE establishes a PDU session through L3 (layer 3) relay, since the 5G network cannot transmit and receive NAS messages with the remote UE, the 5G network cannot perform secondary authentication/authorization of the PDU session of the Remote UE. This is because, when the Remote UE is connected to the Relay UE through the L3 relay, the remote UE cannot transmit and receive NAS messages with the network.

In order to solve this problem, it is necessary to discuss a method for performing secondary authentication/authorization with a remote UE that cannot transmit and receive NAS messages to and from the network.

III. Disclosure of the Present Specification

A method for authenticating a Remote UE can be mainly divided into two types. One of the two may be authentication (eg, authentication performed during registration) that the remote UE receives from a network (eg, 5G network). The other one of the two may be a procedure (eg, secondary authentication/authorization procedure) of authenticating with the DN-AAA server whether access to the session is allowed while the remote UE establishes (or creates) a session with the network. In the first disclosure of the present specification, authentication (eg, authentication performed in the registration process) that the remote UE receives from the network (eg, 5G network) is described, and in the second disclosure of the present specification, while the remote UE establishes (or generates) a session with the network, the procedure (eg, secondary authentication/authorization procedure) for authenticating with the DN-AAA server whether access to the session is allowed will be described.

The disclosures described below in this specification may be implemented in one or more combinations. Each of the drawings shows an embodiment of each disclosure, but the embodiments of the drawings may be implemented in combination with each other.

1. First Disclosure of the Present Specification

The first disclosure of the present specification describes authentication (eg, authentication performed in a registration process) that a remote UE receives from a network (eg, a 5G network).

As described above, the remote UE cannot transmit and receive NAS messages with the network. In order to perform network authentication for a Remote UE that cannot transmit and receive NAS messages, the relay UE may transmit the Remote UE ID of the Remote UE to the network. The network may perform an authentication procedure for the Remote UE ID based on the Remote UE ID. The network may transmit the result of the authentication procedure for the Remote UE ID to the relay UE. The relay UE may perform the procedure of generating (or establishing) a session for the remote UE only when the network authentication procedure is successfully completed. If authentication for the Remote UE is performed after the session is created (or established), the network may instruct the Relay UE to stop the service for the Remote UE.

A detailed procedure according to the first disclosure of the present specification will be described with reference to the examples of FIGS. 10a and 10b.

The following drawings were created to explain a specific example of the present specification. The names of specific devices described in the drawings or the names of specific signals/messages/fields are presented by way of example, so that the technical features of the present specification are not limited to the specific names used in the following drawings.

Figure 10A:
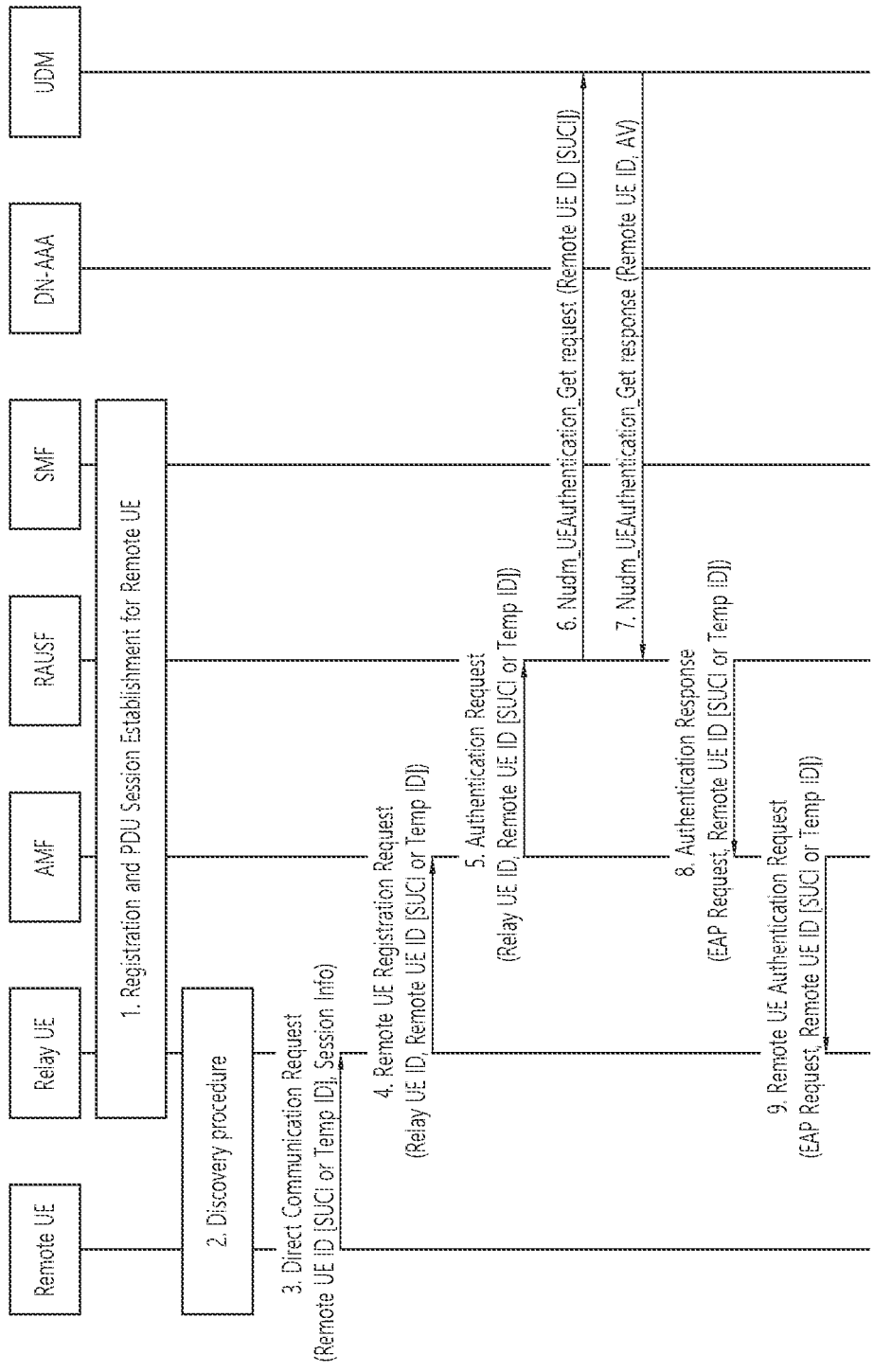
FIGS. 10a and 10b show a signal flow diagram according to an example of the first disclosure of the present specification.
Figure 10B:
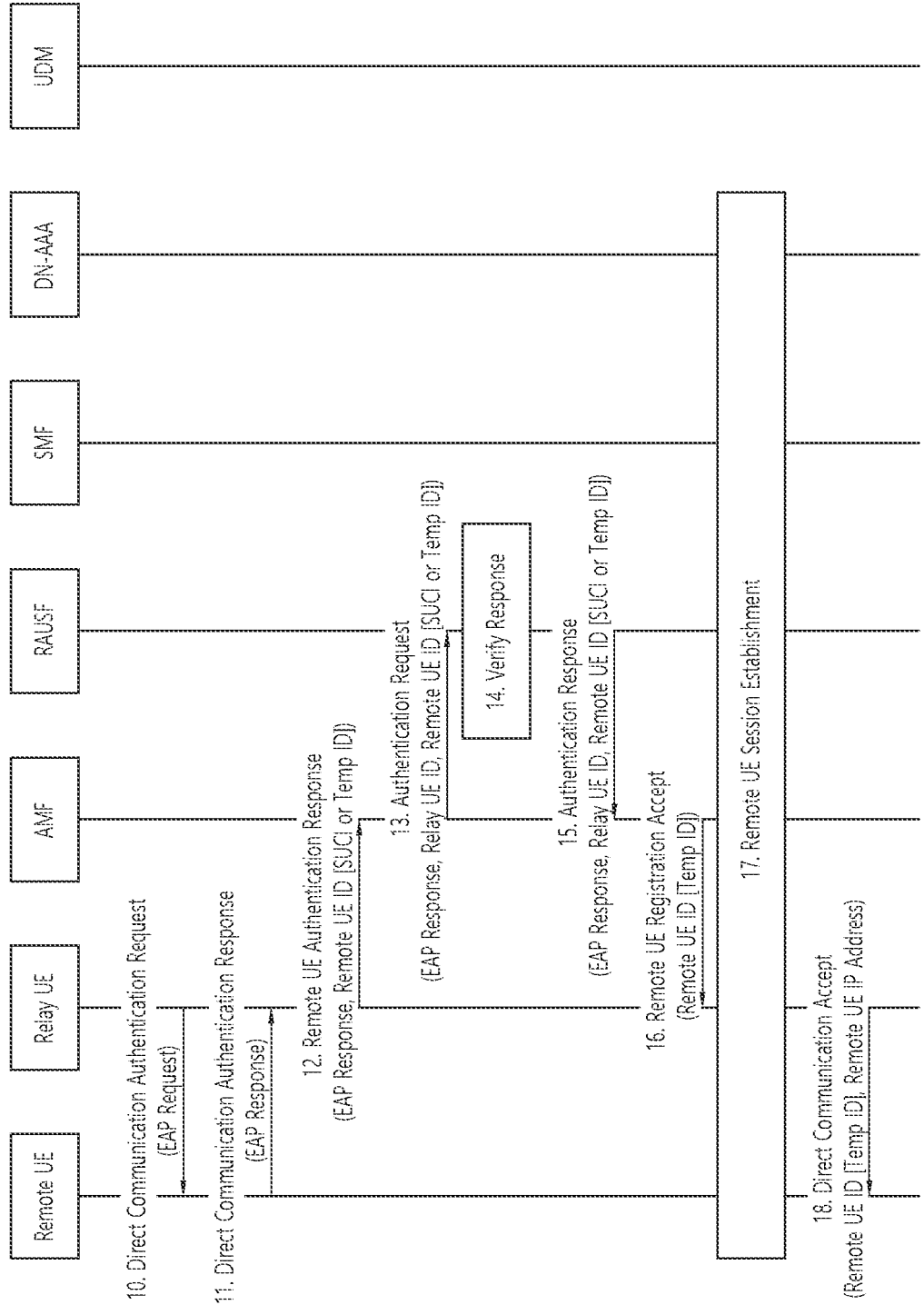

FIGS. 10a and 10b show a signal flow diagram according to an example of the first disclosure of the present specification.

FIGS. 10a and 10b show Remote UE, Relay UE, AMF, Remote UE Authentication Server Function (RAUSF), SMF, DN-AAA (DN-AAA Server), and UDM.

1) Relay UE may perform registration procedure and PDU session establishment procedure. For example, for relaying to the Remote UE, the Relay UE may perform a registration procedure and may establish (or generate) a PDU session for relaying data of the Remote UE.

2) The Remote UE may discover the relay UE by performing a discovery procedure.

3) The Remote UE may transmit a Direct Communication Request message to the relay UE in order to use the relay service. The Direct Communication Request message may include information on the Remote UE ID and information on the session for which the Remote UE wants the service (eg, ID for distinguishing PC5 sessions, Data Network Name (DNN), Single Network Slice Selection Assistance information (S-NSSAI), etc.). The Remote UE may use a Subscription Permanent Identifier (SUPI), a Subscription Concealed Identifier (SUCI), or a temporary ID previously assigned by the AMF (eg, a Globally Unique Temporary Identifier (GUTI)) as the Remote UE ID. The Remote UE may also transmit type information of the Remote UE ID to distinguish SUPI, SUCI, and temporary ID. That is, the Direct Communication Request message may include information on the Remote UE ID, type information of the Remote UE ID, and information on the session for which the Remote UE wants a service.

4) The Relay UE may transmit a Remote UE Registration Request message to the AMF. For example, the Relay UE may transmit the Remote UE Registration Request message to the AMF by including information about the Remote UE ID received from the Remote UE in the Remote UE Registration Request message, for network authentication for the Remote UE. The Remote UE Registration Request message may include information on the Relay UE ID and information on the Remote UE ID (eg, SUPI, SUCI, or temporary ID). In this case, the relay UE may select the same AMF as the AMF that communicates with the relay UE, or may select a separate AMF (eg, dedicated AMF for managing remote UEs). Then, the Relay UE may transmit a Remote UE Registration Request message to the selected AMF.

5) The AMF may transmit an Authentication Request message to the Remote UE Authentication Server Function (RAUSF) to start the authentication procedure for the Remote UE. The authentication request message transmitted by the AMF may include information on the Relay UE ID and information on the Remote UE ID (eg, SUPI, SUCI, or temporary ID).

6 and 7) RAUSF may obtain AV (Authentication Vector) and SUPI information for remote UE authentication from UDM based on information on Remote UE ID. For example, the RAUSF may transmit a request message (eg, Nudm_UEAuthentication_Get request message) including information (eg, SUCI) on the Remote UE ID to the UDM. Then, the UDM may transmit a response message (eg, Nudm_UE-Authentication_Get response message) including information about the Remote UE ID (eg, SUPI) and AV (Authentication Vector) to RAUSF. The UDM may provide the RAUSF with a SUPI matching the SUCI received from the RAUSF.

8) RAUSF may generate an Extensible Authentication Protocol (EAP)-Request message for authentication to the Remote UE. RAUSF may transmit an Authentication Response message including the EAP-Request message and information about the Remote UE ID (information transmitted by the UE in step 3) (eg, SUPI, SUCI, or temporary ID) to the AMF. Here, when the Relay UE has a plurality of Remote UEs (when communicating with a plurality of Remote UEs), in order to inform which Remote UE the message is for authentication, RAUSF may transmit information about the Remote UE ID.

9) The AMF may include the Remote UE ID information (eg, SUPI, SUCI, or temporary ID) and the EAP-Request message transmitted by the RASUF in the Remote UE Authentication Request message and transmit the Remote UE Authentication Request message to the Relay UE.

10) The Relay UE may transmit an EAP-Request message to the Remote UE based on information about the Remote UE ID (eg, SUPI, SUCI, or temporary ID). For example, the Relay UE may transmit a Direct Communication Authentication Request message including an EAP-Request message to the Remote UE.

11) The Remote UE may transmit an EAP-Response message to the Relay UE in response to the EAP-Request message. For example, the Remote UE may transmit a Direct Communication Authentication Response message including an EAP-Response message to the Relay UE.

12) The Relay UE may transmit the EAP-Response message and information about the Remote UE ID (eg, SUPI, SUCI, or temporary ID) to the AMF. For example, the Relay UE may transmit a Remote UE Authentication Response message including an EAP-Response message and information about the Remote UE ID (eg, SUPI, SUCI, or temporary ID) to the AMF.

13) AMF may transmit an EAP-Response message to RAUSF. For example, the AMF may transmit an Authentication Request message including an EAP-Response message, information on Relay UE ID, and information on Remote UE ID (eg, SUPI, SUCI, or temporary ID) to RAUSF..

14) RAUSF may perform authentication for the Remote UE based on the EAP-Response message transmitted by the Remote UE.

15) If the Remote UE used SUCI as information on the Remote UE ID, RAUSF may transmit the SUPI of the Remote UE to the AMF. Here, the SUPI of the Remote UE may be SUPI information received by the RAUSF from the UDM in step 7). For example, the RAUSF may transmit an authentication response message including information (including the SUPI of the Remote UE) about the Remote UE ID to the AMF.

Upon receiving the authentication response message, the AMF may obtain subscriber information of the Remote UE from the UDM based on the SUPI of the Remote UE. The AMF may check whether the Remote UE can currently receive a service through the Relay UE, based on the subscriber information of the Remote UE. For reference, in the present specification, "subscriber information" may be used as the same meaning as "subscription data", "subscription data" or "subscription information".

16) When authentication for the Remote UE is successfully completed and the Remote UE can receive service through the current Relay UE, the AMF may transmit a Remote UE Registration Accept message to the Relay UE. When the Remote UE transmits the SUCI in step 3), the AMF may allocate a temporary ID (eg, 5G-GUTI) to the Remote UE, and transmit the assigned temporary ID to the Relay UE. For example, the AMF may transmit a Remote UE Registration Accept message including information about the Remote UE ID (including temporary ID) to the Relay UE. The AMF may manage the Remote UE based on the remote UE's temporary ID (eg, 5G-GUTI).

17) The Relay UE may store the temporary ID of the Remote UE and perform a procedure of creating (or establishing) a session for the Remote UE. Here, the operations of the second disclosure of the present specification described below may be applied.

18) After the PC5 session for the Remote UE is generated (or established), the Relay UE may trasnmit a Direct Communication Accept message including the Temporary ID information of the Remote UE allocated by AMF and the IP address information to be used in the session to the Remote UE.

2. Second Disclosure of the Present Specification

The second disclosure of the present specification describes a method for supporting secondary authentication.

As described above, the remote UE cannot transmit and receive NAS messages with the network. In order to perform secondary authentication/authorization for the Remote UE that cannot transmit and receive NAS messages, the Relay UE may provide the ID information of the Remote UE (eg, SUCI, ProSe Key Management Function (PKMF), etc.) to the SMF, during the Relay UE performs a procedure for generating PC5 unicast link for the Remote UE. The SMF may recognize that the Remote UE wants to receive a service through the Relay UE based on ID information (eg, SUCI, PKMF, etc.) of the Remote UE. And, the SMF may perform secondary authentication/authorization for the Remote UE based on ID information (eg, SUCI, PKMF, etc.) of the Remote UE. In addition, if necessary, the SMF may provide a Generic Public Subscription Identifier (GPSI) of the Remote UE to the DN-AAA server. The SMF may determine whether to perform secondary authentication for the Remote UE based on subscriber information (or data) of the terminal. Therefore, in order for the SMF to determine whether secondary authentication for the Remote UE is required, subscriber information (or data) for the Remote UE is required. In order for the SMF to receive the subscriber information of the Remote UE from the UDM, the SUPI of the Remote UE is required. Therefore, when the Remote UE provides SUCI, it may be necessary to convert the SUCI of the Remote UE to SUPI.

A detailed procedure according to the second disclosure of the present specification will be described with reference to the examples of FIGS. 11a to 11c.

The following drawings were created to explain a specific example of the present specification. The names of specific devices described in the drawings or the names of specific signals/messages/fields are presented by way of example, so that the technical features of the present specification are not limited to the specific names used in the following drawings.

Figure 11B:
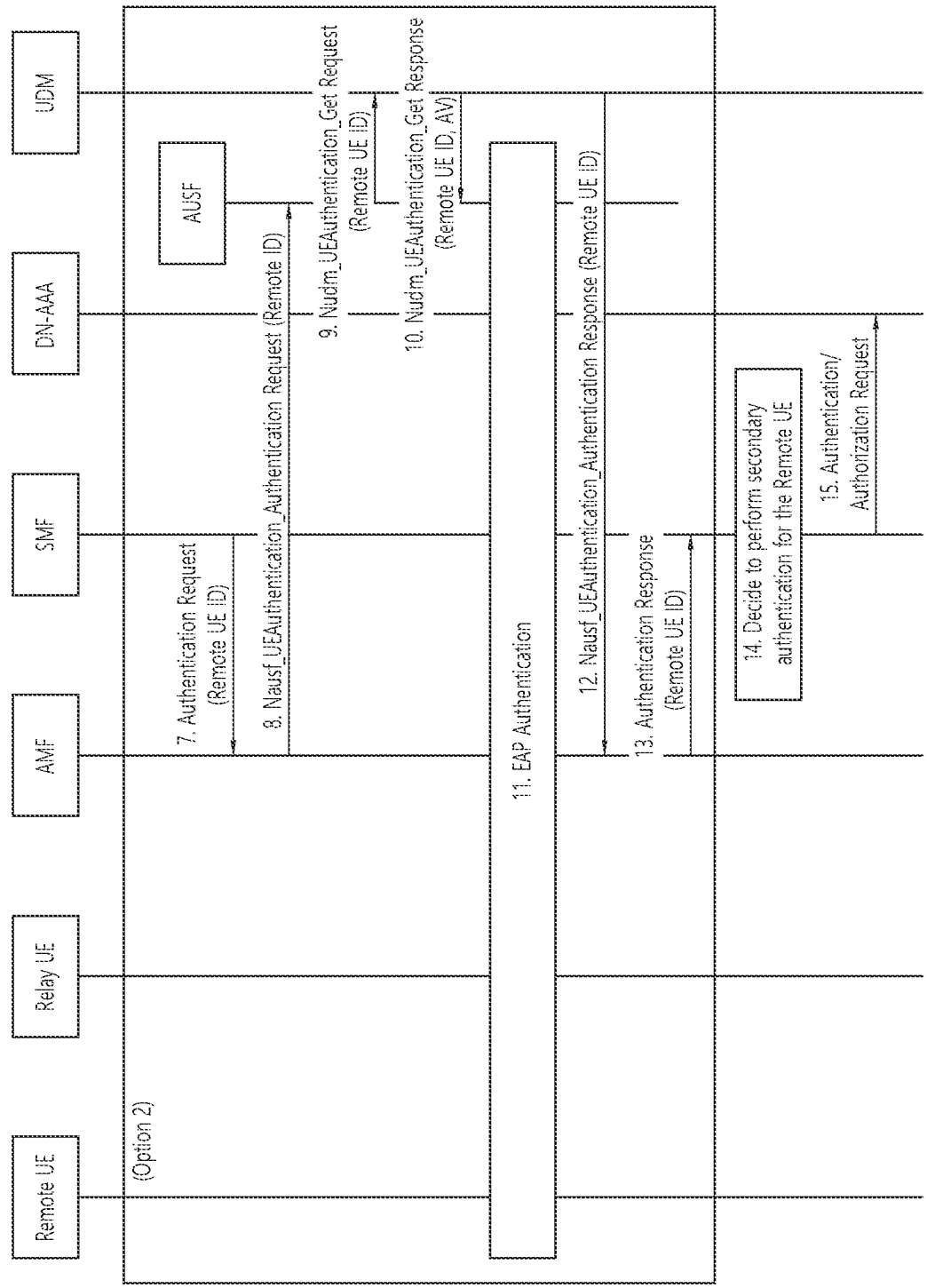
Figure 11C:
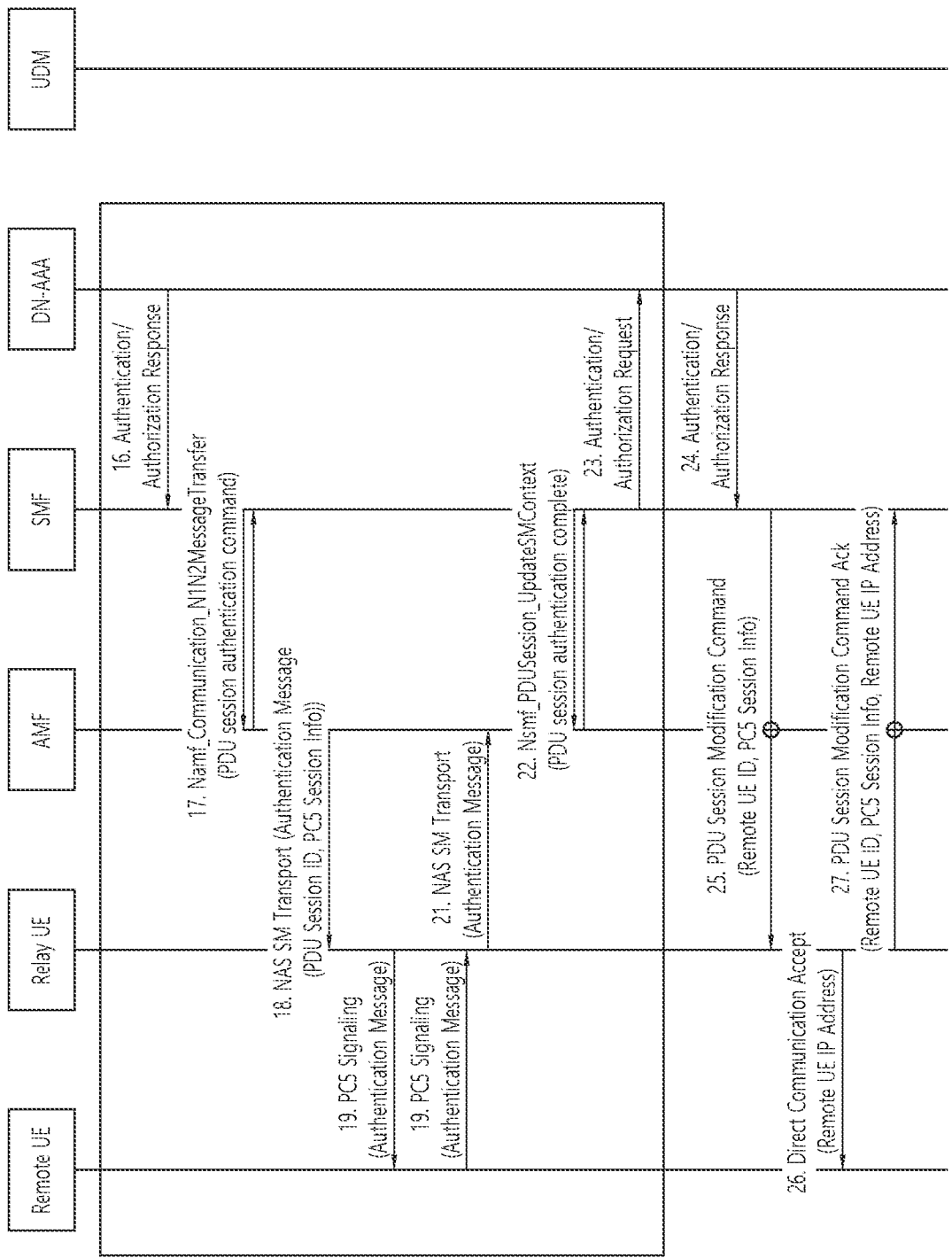

FIGS. 11a to 11c show a signal flow diagram according to an example of the second disclosure of the present specification.

FIGS. 11a to 11c show Remote UE, Relay UE, AMF, SMF, DN-AAA (DN-AAA Server), AUSF and UDM.

1) Relay UE may perform registration procedure and PDU session establishment procedure. For example, the Relay UE may establish (or generate) a PDU session for relaying a registration procedure and data of the Remote UE for relaying to the Remote UE.

2) The Remote UE may discover the relay UE by performing a discovery procedure.

3) The Remote UE may transmit a Direct Communication Request message to the relay UE in order to use the relay service. The Direct Communication Request message may include information on the Remote UE ID and information on the session for which the Remote UE desires a service (eg, ID for distinguishing a PC5 session, DNN, S-NSSAI, etc.). The Remote UE may use a Subscription Permanent Identifier (SUPI), a Subscription Concealed Identifier (SUCI), or a temporary ID previously assigned by the AMF (eg, a Globally Unique Temporary Identifier (GUTI)) as the Remote UE ID. The Remote UE may also transmit type information of the Remote UE ID in order to distinguish SUPI, SUCI, and temporary ID. That is, the Direct Communication Request message may include information on the Remote UE ID, type information of the Remote UE ID, and information on the session for which the Remote UE wants a service.

4) Relay UE includes information on Remote UE ID (eg, SUPI, SUCI or temporary ID), type information of Remote UE ID, and information on session (eg, ID for distinguishing PC5 sessions, DNN, S-NSSAI, etc.) in the PDU Session Modification Request message and transmit the PDU Session Modification Request message to the SMF. At this time, in order to inform that the Relay UE starts relaying for the Remote UE, the Releay UE may inlcude information on the Remote UE ID (eg, SUPI, SUCI, or temporary ID) and information on the session (eg, information on the session transmitted by the Remote UE) and PC5 session information (eg, including PC5 link identity) for identifying the session requested by the Remote UE) in the PDU Session Modification Request message. If the Remote UE provides information for secondary authentication in step 3), the Relay UE may also include information for secondary authentication in the PDU Session Modification Request message and may transmit the PDU Session Modification Request message. For reference, the Relay UE may transmit a PDU session modification request message to the SMF through the AMF.

If the relay UE does not previously generate (or establish) a PDU session in step 1), the relay UE may generate PDU session by transmitting a PDU session establishment request message instead of a PDU Session Modification Request message. For example, the Relay UE may generate session for Remote UE by transmitting PDU Session Establishment Request message including a related information such as information about the Remote UE ID (eg, SUPI, SUCI, or temporary ID), type information of the Remote UE ID, and information about the session (eg, information about the session transmitted by the Remote UE and PC5 session information for distinguishing session requested by the Remote UE.

If the network does not perform authentication for the Remote UE according to the operation described in the first disclosure of this specification, the SMF may require subscription data of the Remote UE to determine whether secondary authentication for the Remote UE is required. In this case, the SMF may check the type information of the Remote UE ID. The SMF may identify the SUPI of the Remote UE, request the UDM for subscription data of the Remote UE based on the SUPI of the Remote UE, and receive the subscription data of the Remote UE from the UDM. If the Remote UE transmits the SUCI or temporary ID as information on the Remote UE ID, a procedure for converting the SUCI or temporary ID into SUPI is required. This is because SMF cannot directly convert SUCI to SUPI.

In order to convert SUCI or temporary ID into SUPI, operations (Option 1) and/or (Option 2) shown in FIGS. 11a to 11c may be performed. For reference, only operations related to (Option 1) shown in FIGS. 11a to 11c may be performed, and only operations related to (Option 2) may be performed. Alternatively, (Option 1) and (Option 2) shown in FIGS. 11a to 11c may be combined and performed.

If the network has performed authentication for the Remote UE as described in the first disclosure of the present specification, the AMF may have received the SUPI information of the Remote UE in step 15 of FIGS. 10a and 10b. In this case, the AMF may transmit the SUPI information of the Remote UE in the PDU session modification request message in step 4) of FIGS. 11a to 11c. For this (so that the AMF can deliver the SUPI information to the SMF), the Relay UE may include an indication (or information) indicating that a signaling is for the Remote UE and a temporary ID or SUCI of the Remote UE in the UL NAS Transport message. have.

Operations corresponding to (Option 1) of FIGS. 11a to 11c will be described first.

(Option 1)

5) When the information on the Remote UE ID received by the SMF in step 4) is SUCI, the SMF may transmit a request message (eg, Nudm_UEAuthentication_Get request message) to the UDM. The SMF may transmit a Nudm_UEAuthentication_Get request message including information on the Remote UE ID (SUCI) to the UDM. Additionally, the SMF may include an indication (or information) indicating that it is related to the Remote UE in the Nudm_UEAuthentication_Get request message.

6) The UDM may generate a SUPI based on the SUCI transmitted by the SMF. The UDM may transmit a response message (eg, Nudm_UEAuthentication_Get response message) to the SMF. The response message (eg, Nudm_UEAuthentication_Get response message) may include information about the Remote UE ID (SUPI).

When the SMF transmits an indication (or information) indicating that the UDM is related to the Remote UE, the UDM may include only the SUPI in the response message (eg, Nudm_UEAuthentication_Get response message) without including the AV. Alternatively, when the SMF transmits a request message (eg, Nudm_UEAuthentication_Get request message), regardless of whether the SMF transmitted an indication (or information) indicating it is related to the Remote UE or not, the UDM may not include the AV, but only include the SUPI in the response message (eg Nudm_UEAuthentication_Get response message). The reason why the UDM does not transmit the AV is that the AV is used when authenticating the terminal during the registration procedure and does not need to be used after step 7).

Operations corresponding to (Option 2) of FIGS. 11a to 11c will be described.

(Option 2)

7) The SMF may transmit an authentication request message to the AMF. For example, when the information on the Remote UE ID received by the SMF in step 4) is a SUCI or a temporary ID, the SMF may transmit an authentication request message to the AMF. For another example, when the Remote UE transmits the SUPI (that is, when the information on the Remote UE ID received in step 4 by the SMF is SUPI) or when the SMF receives the SUPI through the operation described in (Option 1), in order to perform authentication for the Remote UE, the SMF may transmit an authentication request message to the AMF.

At this time, when the terminal transmits the temporary ID (that is, when the information on the Remote UE ID received in step 4 by the SMF is the temporary ID), the SMF may select the AMF, which will receive the authentication request message, based on the temporary ID. Otherwise, the SMF may select the AMF, for example, by selecting a preset AMF or selecting the AMF based on the NRF.

8 to 12) If the AMF does not have the context of the Remote UE based on the temporary ID, the AMF may perform an authentication procedure with the AUSF, the terminal, and the like. For example, the AMF may transmit an authentication request message (eg, a Nausf_UEAuthentication_Authentication Request message) to the AUSF. In addition, the AMF may include information about the Remote UE ID (eg, SUPI or SUCI) in the authentication request message transmitted to the Relay UE in order to inform that the authentication is for the Remote UE.

The AUSF may transmit a request message (Nudm_UE-Authentication_Get request message) including information about the Remote UE ID (eg, SUPI or SUCI) to the UDM.

Then, the UDM may transmit a response message (eg, Nudm_UEAuthentication_Get response message) including information about the Remote UE ID (eg, SUPI) and AV (Authentication Vector) to the AUSF.

AUSF, SMF, AMF, Relay UE and Remote UE may perform the EAP authentication procedure.

After the EAP authentication procedure is performed, the AUSF may transmit an authentication response message (eg, Nausf_UEAuthentication_Authentication Response message) including information about the Remote UE ID (eg, SUPI) to the AMF.

The AMF may transmit an authentication response message including information about the Remote UE ID (eg, SUPI) to the SMF.

For reference, although not shown in FIGS. 11a to 11c, after the AMF receives an authentication response message (eg, Nausf_UEAuthentication_Authentication Response message) in step 11), and then, in the same manner as in step 9) of FIGS. 10a and 10b, the AMF may transmit an Authentication Request message for the Remote UE to Relay UE. When the Relay UE receives the Authentication Request message for the Remote UE, the Relay UE may transmit parameters related to the EAP message to the Remote UE using PC5 signaling (PC5 signaling may be performed as the same manner of step 10) of FIGS. 10a and 10b). The Remote UE may transmit a response (eg, a response to parameters related to the EAP message) to the Relay UE by including the response it in PC5 signaling (this transmission may be performed in the same manner of step 11 of FIGS. 10a and 10b). The Relay UE may include the Remote UE's response in the Authentication Response message and transmit the Authentication Response message to the AMF (this may be performed as the same way of step 12 of FIGS. 10a and 10b). In this case, the Relay UE may include information about Remote UE ID (e.g. SUCI or temp ID) in the Authentication Response message, in order to inform that the Authentication Response message is related to authentication for the Remote UE. When the authentication for the Remote UE (eg EAP authentication) is successfully completed, if the SMF transmitted an authentication request message including information about the Remote UE ID (SUCI) in Step 7, AUSF may transmit the authentication response message (eg, Nausf_UEAuthentication_Authentication Response message) of step 12) to the AMF by including information (SUPI) about the Remote UE ID in the authentication response message.

For reference, if the AMF has the context of the Remote UE based on the temporary ID, the AMF may perform step 13) without performing additional authentication procedures (eg, procedures of steps 8) to 12)).

13) The AMF may transmit an authentication response message to the SMF when the authentication for the terminal is successful. When the SMF transmits the authentication request message including the SUCI in step 7), the AMF may transmit an authentication response message including the Remote UE ID information (SUPI) received from the AUSF to the SMF. In addition, the AMF may allocate an ID for the Remote UE in addition to the SUPI, and inform the SMF of the assigned ID (e.g. 5G-GUTI). When authentication for the terminal fails, the AMF may transmit an authentication failure message to the SMF.

14) The SMF may determine whether secondary authentication is required for the remote UE's request (eg, the direct communication request message of step 3). For example, the SMF may determine whether secondary authentication is required based on the subscription data of the Remote UE.

15 to 24) SMF may perform a secondary authentication procedure.

For example, in step 15), the SMF may transmit an authentication/authorization request message (Authentication/Authorization Request message) to the DN-AAA server. Then, in step 16), the DN-AAA server may transmit an authentication/authorization response message (Authentication/Authorization Response message) to the SMF.

In step 17), upon receiving an Authentication/Authorization Response message from the DN-AAA server, the SMF may transmit a PDU Session Authentication Command message to the AMF. For example, the SMF may transmit a Namf_Communication_N1N2MessageTransfer message including a PDU Session Authentication Command message to the AMF. At this time, the SMF may transmit the PDU Session Authentication Command message by including information about the Remote UE ID (eg SUPI) in the PDU Session Authentication Command message, in order to inform that it is an authentication procedure for the Remote UE. In addition, the SMF may include information on which PC5 session authentication is associated with (eg, PC5 session information) in the PDU Session Authentication Command message.

In step 18), the AMF may transmit an authentication message (including PDU session ID and PC5 session information) to the Relay UE. For example, the AMF may transmit a NAS SM Transport message including an authentication message (including PDU session ID and PC5 session information) to the Relay UE.

In step 19), the Relay UE receiving the PDU Session Authentication Command message may transmit parameters related to the EAP message included in the PDU Session Authentication Command message to the Remote UE by using PC5 signaling. For example, the Relay UE may transmit an authentication message including parameters related to the EAP message to the Remote UE by using PC5 signaling. The authentication message transmitted by the Relay UE may also include information on which PC5 session authentication is associated with (eg, PC5 session information).

In step 20), the Remote UE may transmit a response message (eg, Authentication message) to the authentication message transmitted by the Relay UE to the Relay UE using PC5 signaling. The response message (eg, Authentication message) transmitted by the Remote UE may also include information on which PC5 session authentication is associated with (eg, PC5 session information).

In step 21), the Relay UE may transmit the Remote UE's response to the AMF by including the Remote UE's response in the Authentication Response. The Relay UE may include information on the Remote UE ID (e.g. SUCI, Temp ID) in the Authentication Response to inform that it is authentication for the Remote UE. In addition, the Authentication Response transmitted by the Relay UE may include information about which PC5 session authentication is associated with (eg, PC5 session information). The Relay UE may transmit a NAS SM Transport message including an Authentication Response to the AMF.

In step 22), the AMF may transmit a PDU Session authentication complete message to the SMF. For example, the AMF may transmit an Nsmf_PDUSession UpdateSMContext message including a PDU Session authentication complete message to the SMF.

In step 23), the SMF may transmit an authentication/authorization request message to the DN-AAA server.

In step 24), the DN-AAA server may transmit an SMF authentication/authorization response message to the SMF.

25) When the SMF receives a message from the DN-AAA server indicating that the secondary authentication has been successfully performed, the SMF may transmit a PDU Session Modification Command message to the Relay UE. Here, the PDU session modification command message may include information on the Remote UE ID and information on which whether PC5 session authentication has been successful. When the SMF receives a message from the DN-AAA server notifying that the secondary authentication has failed, the PDU session modification command message may include information about the Remote UE ID and at which stage (eg network authentication or secondary authentication) authentication failed. In addition, the SMF may include the ID (e.g. 5G-GUTI) allocated by the AMF for the Remote UE in the PDU Session Modification Command message and transmit the PDU Session Modification Command message to the Relay UE.

26) The Relay UE may transmit a Direct Communication Accept message to the Remote UE based on the PDU Session Modification Command message received from the SMF. A Relay UE can transmit a Direct Communication Accept message by including the IP address information (eg, IP address information assigned by the Relay UE) to be used in the corresponding PC5 session in the Direct Communication Accept message. In addition, the Direct Communication Accept message may include the ID (e.g. 5G-GUTI) allocated by the AMF for the Remote UE. The Remote UE may transmit data to the Relay UE based on the IP address information received from the Relay UE. In addition, the Remote UE may use the Remote UE ID allocated by the AMF for subsequent PC5-related signaling.

27) The Relay UE may transmit a PDU Session Modification Command Ack message to the SMF. The relay UE may transmit the PDU Session Modification Command Ack message by including the IP address information used in the PC5 session with the Remote UE in the PDU Session Modification Command Ack message. In addition, the PDU Session Modification Command Ack message transmitted by the Relay UE may include information about the Remote UE ID, PC5 session information, and IP address information. The SMF may transmit IP address information used by the Remote UE together with the Remote UE's GPSI to the DN-AAA server.

Hereinafter, specific examples of the second disclosure of the present specification will be described. The operations described in the examples below may be applied in combination with the operations of the second disclosure of the present specification described above, or may be applied independently.

For reference, the operations described in FIGS. 11a to 11c may include operations related to secondary authentication/authentication performed when the Relay UE receives a request (eg, Direct Communication Request message of step 3) for creating a PC5 connection from the Remote UE (ie, before the request for creating the PC5 connections is accepted). And, the operations of the first to third examples of the second disclosure of the present specification to be described below may include operations related to secondary authentication/authorization performed after the PC5 connection between the Relay UE and the Remote UE is created.

2-1. A First Example of the Second Disclosure of the Present Specification

When the UE establishes a PDU session, if the UE's subscription information (or subscription data) indicates that secondary authentication is required for PDU session establishment, the SMF may perform secondary authentication. If authentication fails, the UE cannot establish a PDU session.

During the procedure for establishing the PDU session, the UE provides authentication/authorization information corresponding to the DN-specific identity, and the SMF may determine that secondary authentication/authorization for establishing the PDU session is required based on the SMF policy associated with the DN. In this case, if the DN-AAA server is located in the DN, the SMF may deliver the authentication/authorization information to the DN-AAA server through the UPF. If the SMF determines that secondary authentication/authorization for PDU session establishment is necessary, but the UE does not provide a DN-specific identity as part of the PDU session establishment request, the SMF may request the UE to provide DN-specific identity to the by using the EAP procedure. If the secondary authentication/authorization for PDU session establishment fails, the SMF may reject PDU session establishment.

When the UE receives a service through the UE-to-Network Relay, if secondary authentication is not performed, the Remote UE cannot receive the service from the third-party server. This is because the IP address of the Remote UE is not authenticated by the DN-AAA server. Therefore, when a Remote UE is connected via UE-to-Network Relay, secondary authentication must be supported.

In order to provide relay traffic for the Remote UE, a UE capable of operating as a 5G ProSe UE-to-Network Relay (same as the Relay UE in the example of FIGS. 10a-11c) may register with the network (if the UE is not yet registered), and the UE may establish a PDU session that activates the necessary relay traffic. Alternatively, in order to provide relay traffic for a Remote UE, a UE capable of operating as a 5G ProSe UE-to-Network Relay may establish an additional PDU session or modify an existing PDU session. A PDU session supporting UE-to-Network Relay may be used only for relay traffic of Remote ProSe UE(s) (ie, Remote UE).

The following drawings were created to explain a specific example of the present specification. The names of specific devices described in the drawings or the names of specific signals/messages/fields are presented by way of example, so that the technical features of the present specification are not limited to the specific names used in the following drawings.

Figure 12A:
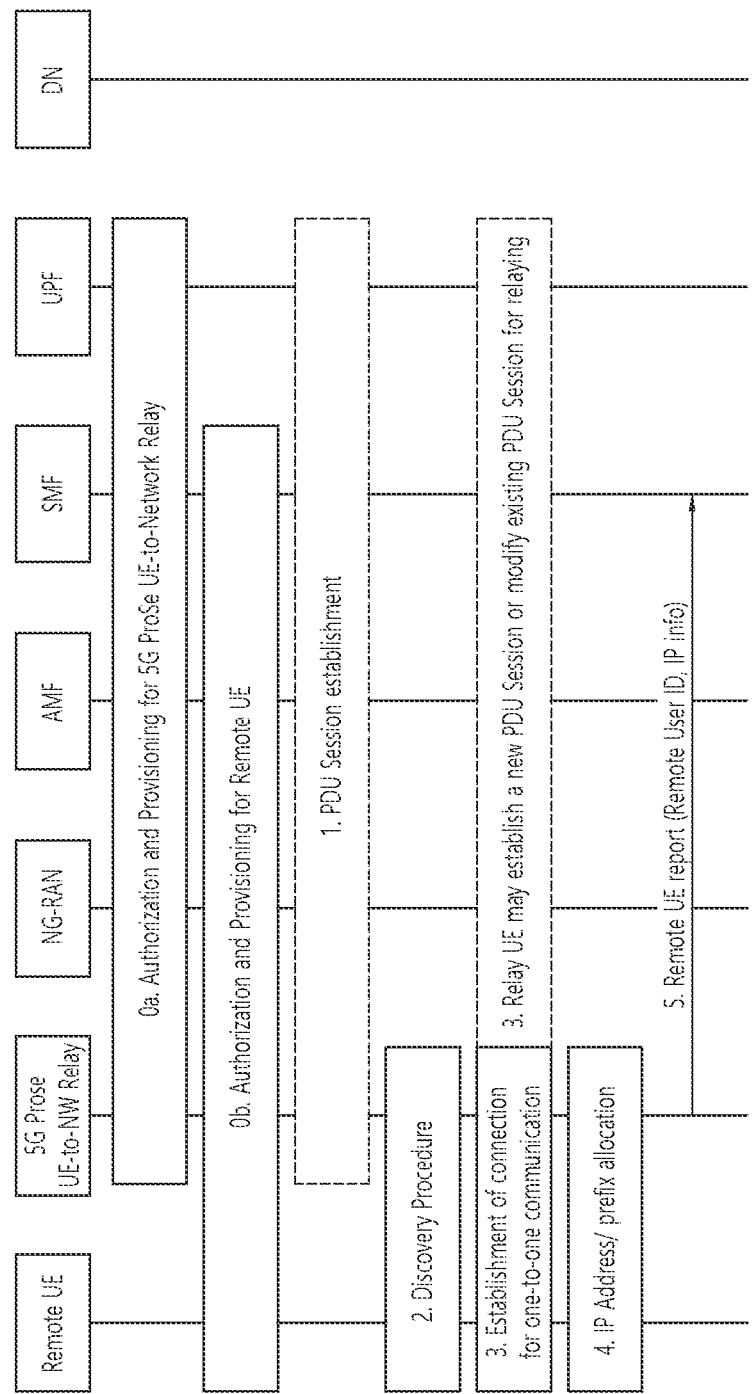
FIGS. 12a and 12b are diagrams illustrating an example of a signal flow diagram according to a first example of the second disclosure of the present specification.
Figure 12B:
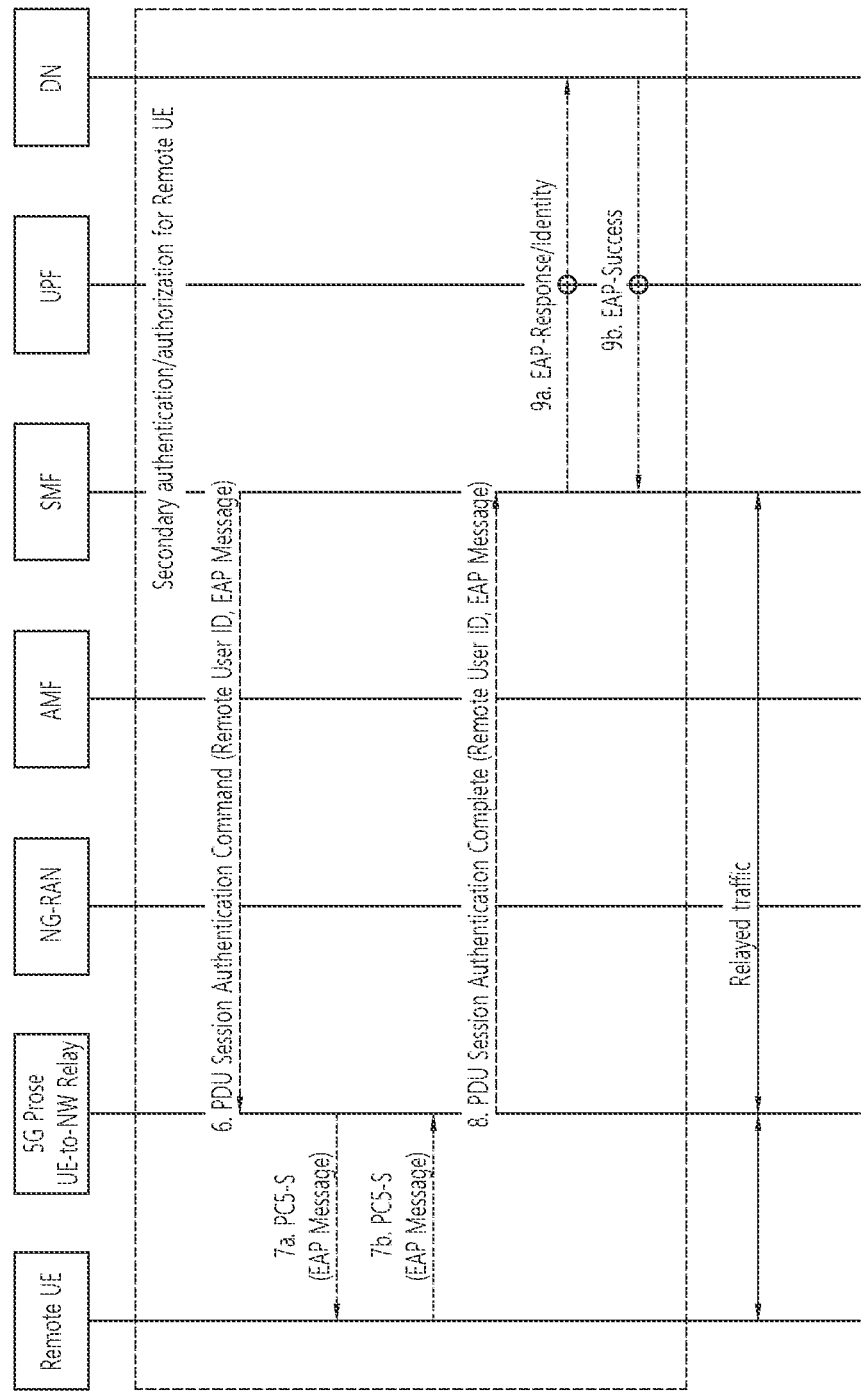

FIGS. 12a and 12b are diagrams illustrating an example of a signal flow diagram according to a first example of the second disclosure of the present specification.

FIGS. 12a and 12a show Remote UE, 5G ProSe UE-to-NW (Network) Relay (ie, Relay UE), NG-RAN, AMF, SMF, UPF and Data Network (DN).

0) During the registration procedure, Authorization and provisioning for ProSe UE-to-NW relay and Remote UE may be performed.

1) The 5G ProSe UE-to-Network Relay may a establish PDU session for relaying data of the Remote UE, based on the default PDU session parameter received in step 0) or the default PDU session parameter preset in the UE-to-Network Relay. The default PDU session parameter may be, for example, S-NSSAI, DNN, Session and service continuity (SSC) mode, and the like. In case of IPv6, the ProSe UE-to-Network Relay may obtain an IPv6 prefix from the network through a prefix delegation function.

2) Based on the authorization and provisioning in step 0), the Remote UE may perform a discovery procedure for the 5G ProSe UE-to-Network Relay. The Remote UE may learn about a connectivity service provided by the 5G ProSe UE-to-Network Relay while performing a discovery procedure.

3) The Remote UE may select a 5G ProSe UE-to-Network Relay and establish a connection for One-to-one ProSe Direct Communication. If there is no PDU session that satisfies the requirements of PC5 connection with the Remote UE (eg S-NSSAI, DNN, QoS, etc.), 5G ProSe UE-to-Network Relay may initiation a PDU session establishment procedure for establishing a new PUD session for relay, or initiate a PDU session modification procedure.

4) An IPv6 prefix or an IPv4 address for the Remote UE may be assigned. After step 4), uplink relay and downlink relay may be started.

5) The 5G ProSe UE-to-Network Relay may transmit a Remote UE Report message to the SMF for a PDU session related to the relay. The Remote UE Report message may include Remote User ID and IP information. The Remote User ID may be the identity of the Remote UE user successfully connected in step 3) (which may be provided through user information). The SMF may store the Remote User ID and related IP information in the SM context of the 5G ProSe UE-to-Network Relay for the PDU session related to the relay.

For IP information, the following principles can be applied:

In case of IPv4, the UE-to-network relay may report the Transmission Control Protocol/User Datagram Protocol (TCP/UDP) port range assigned to each Remote UE together with the Remote User ID.

In case of IPv6, the UE-to-network relay may report the IPv6 prefix assigned to each Remote UE together with the Remote User ID.

6) When the SMF receives the Remote UE Report, the SMF may retrieve the Remote UE's subscription data from the UDM and receive the Remote UE's subscription data from the UDM. At this time, if the Remote UE ID received by the SMF is SUCI, the SMF may perform the Option 1 operation or Option 2 operation of FIGS. 10a and 10b to convert the SUCI to SUPI. And, the SMF may perform a secondary authentication/authorization procedure for the Remote UE. The SMF may transmit a PDU Session Authentication Command message including a Remote User ID to the 5G ProSe UE-to-Network Relay. The PDU session authentication command message includes an EAP message for performing authentication.

7a and 7b) The 5G ProSe UE-to-Network Relay may transmit an EAP message to the Remote UE through PC5-S signaling. The Remote UE may transmit an EAP message to the Relay UE through PC5-S signaling. Here, PC5-S signaling may mean control plane signaling performed through a PC5 interface.

8) The 5G ProSe UE-to-Network Relay may transmit a PDU Session Authentication Complete message to the SMF. The PDU session authentication completion message may include a Remote User ID and an EAP message received from the Remote UE.

9a and 9b) The DN-AAA server may confirm successful authentication/authentication. For example, when the SMF transmits an EAP-Response/Identity message to the DN-AAA server, the DN-AAA server may transmit an EAP-Success message to the SMF. For reference, the DN-AAA may not know whether the UE is connected to the network through the 5G ProSe UE-to-Network Relay or is directly connected to the network.

The Remote UE Report message may be transmitted to inform the SMF that the Remote UE has left when the Remote UE disconnects from the 5G ProSe UE-to-Network Relay. For example, a Remote UE may disconnect from the 5G ProSe UE-to-Network Relay due to an explicit layer-2 link release or absence of keep alive messages over PC5.

If the SMF is changed while the Registration Update procedure is being performed, the Remote User ID corresponding to the connected Remote UE and related IP information are transmitted to the new SMF as part of the SM context delivery for the 5G ProSe UE-to-Network Relay.

For reference, if the SMF is located in the HPLMN, in order for the SMF to have Remote UE information, HPLMN and Visited Public Land Mobile Network (VPLMN), in which the 5G ProSe UE-to-Network Relay is authorized to operate, should support the delivery of parameters related to the Remote UE After the Remote UE is connected to the 5G ProSe UE-to-Network Relay, for relay reselection, the Remote UE may continue to perform measurement of signal strength of discovery message transmitted from the 5G ProSe UE-to-Network Relay.

The operations described with reference to FIGS. 12a and 12b may be applied even when the 5G ProSe UE-to-Network Relay UE is connected to the EPS using LTE.

In order to perform operations according to the first example of the second disclosure of the present specification, the SMF may support procedures related to a Remote UE report. The UE may support procedures related to Remote UE and 5G ProSe UE-to-Network Relay.

2-2. Second Example of the Second Disclosure of the Present Specification

If the UE's subscription information indicates that secondary authentication is required, the Remote UE shall perform secondary authentication. Since the application server cannot distinguish whether the UE is connected to 5GC through the UE-to-Network Relay or is directly connected to 5GC, when the UE connects to the application without performing secondary authentication, the application considers the UE as an abnormal UE, so the application server cannot provide a service to the UE. Therefore, secondary authentication should be supported even if the UE is connected to 5GC through UE-to-Network Relay.

The following drawings were created to explain a specific example of the present specification. The names of specific devices described in the drawings or the names of specific signals/messages/fields are presented by way of example, so that the technical features of the present specification are not limited to the specific names used in the following drawings.

Figure 13:
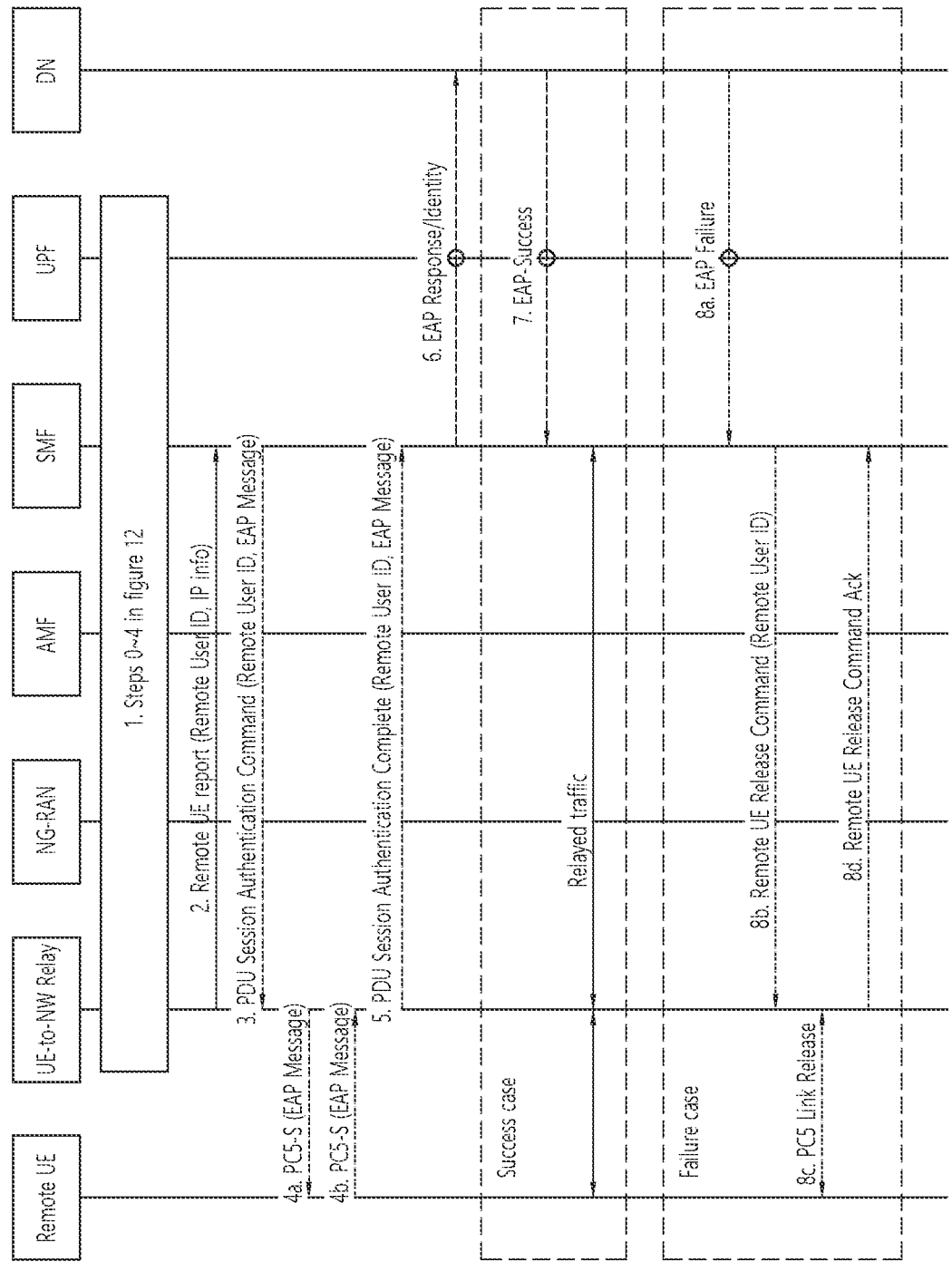
FIG. 13 is a diagram illustrating an example of a signal flow diagram according to a second example of the second disclosure of the present specification.

FIG. 13 is a diagram illustrating an example of a signal flow diagram according to a second example of the second disclosure of the present specification.

FIG. 13 shows Remote UE, UE-to-NW (Network) Relay (ie, Relay UE), NG-RAN, AMF, SMF, UPF and Data Network (DN).

1) The operations of steps 0) to 4) described in the example of FIGS. 12a and 12b may be performed.

2) The 5G ProSe UE-to-Network Relay may transmit a Remote UE Report message to the SMF for a PDU session related to the relay. The Remote UE Report message may include Remote User ID and IP information. Step 2) may be performed in the same manner as step 5) described with reference to FIGS. 12a and 12b.

3) When the SMF receives the Remote UE Report, if the Remote UE ID received by the SMF is SUCI, the SMF may perform the Option 1 operation or Option 2 operation of FIGS. 10a and 10b to convert the SUCI to SUPI. Then, the SMF may retrieve the subscription data of the Remote UE from the UDM and receive the subscription data of the Remote UE from the UDM. And, the SMF may perform a secondary authentication/authorization procedure for the Remote UE. The SMF may transmit a PDU Session Authentication Command message including a Remote User ID to the 5G ProSe UE-to-Network Relay.

4a and 4b) The 5G ProSe UE-to-Network Relay may transmit an EAP message to the Remote UE through PC5 signaling. The Remote UE may transmit an EAP message to the Relay UE through PC5 signaling.

5) The 5G ProSe UE-to-Network Relay may transmit a PDU Session Authentication Complete message to the SMF. The PDU session authentication completion message may include a Remote User ID and an EAP message received from the Remote UE.

6) The SMF may transmit an EAP message (eg, EAP-Response/Identity message) to the DN-AAA server.

The DN-AAA server may perform secondary authentication/authentication based on the EAP message. According to the result of the secondary authentication/authorization, operations corresponding to the Success case shown in FIG. 13 or operations corresponding to the Failure case (failure case) shown in FIG. 13 may be performed.

7) If authentication/authorization is successful, the DN-AAA server may transmit an EAP-Success message to the SMF. Then, traffic between the Remote UE and the network (downlink traffic and uplink traffic) may be relayed by the UE-to-NW Relay.

8) If authentication/authorization fails, the DN-AAA server may transmit an EAP-Failure message to the SMF. The SMF may transmit a NAS message (eg, a PDU session modification command message or a Remote UE Release Command message, etc.) to the 5G ProSe UE-to-Network Relay. Here, the NAS message may include a Remote User ID for indicating the Remote UE. And, the 5G ProSe UE-to-Network Relay may release the PC5 link with the Remote UE.

For reference, when a plurality of Remote UEs are connected to the 5G ProSe UE-to-Network Relay almost simultaneously, the network, the Remote UE, and the 5G ProSe UE-to-Network Relay may perform the secondary authentication procedure in parallel.

For reference, the DN-AAA server cannot distinguish whether the UE is connected to 5GC through the UE-to-Network Relay or is directly connected to 5GC.

In order to perform operations according to the second example of the second disclosure of the present specification, the Remote UE may transmit and receive an EAP message through PC5 signaling.

In order to perform operations according to the second example of the second disclosure of the present specification, the UE-to-Network Relay may include the Remote User ID in the PDU session authentication message and relay the EAP message between the UE and the SMF.

In order to perform operations according to the second example of the second disclosure of the present specification, the SMF may determine whether to perform secondary authentication based on subscription information of the Remote UE. When the SMF performs secondary authentication for the Remote UE, the Remote User ID may be included in the PDU session authentication message. If the secondary authentication fails, the SMF may transmit a NAS message to release the PC5 link.

2-3. Third Example of the Second Disclosure of the Present Specification

A third example of the second disclosure of the present specification is an example specifically describes an operation of delivering an EAP-Success message or an EAP-Failure message to a Remote UE, based on the operations described in the second example of the second disclosure of the present specification.

The following drawings were created to explain a specific example of the present specification. The names of specific devices described in the drawings or the names of specific signals/messages/fields are presented by way of example, so that the technical features of the present specification are not limited to the specific names used in the following drawings.

Figure 14:
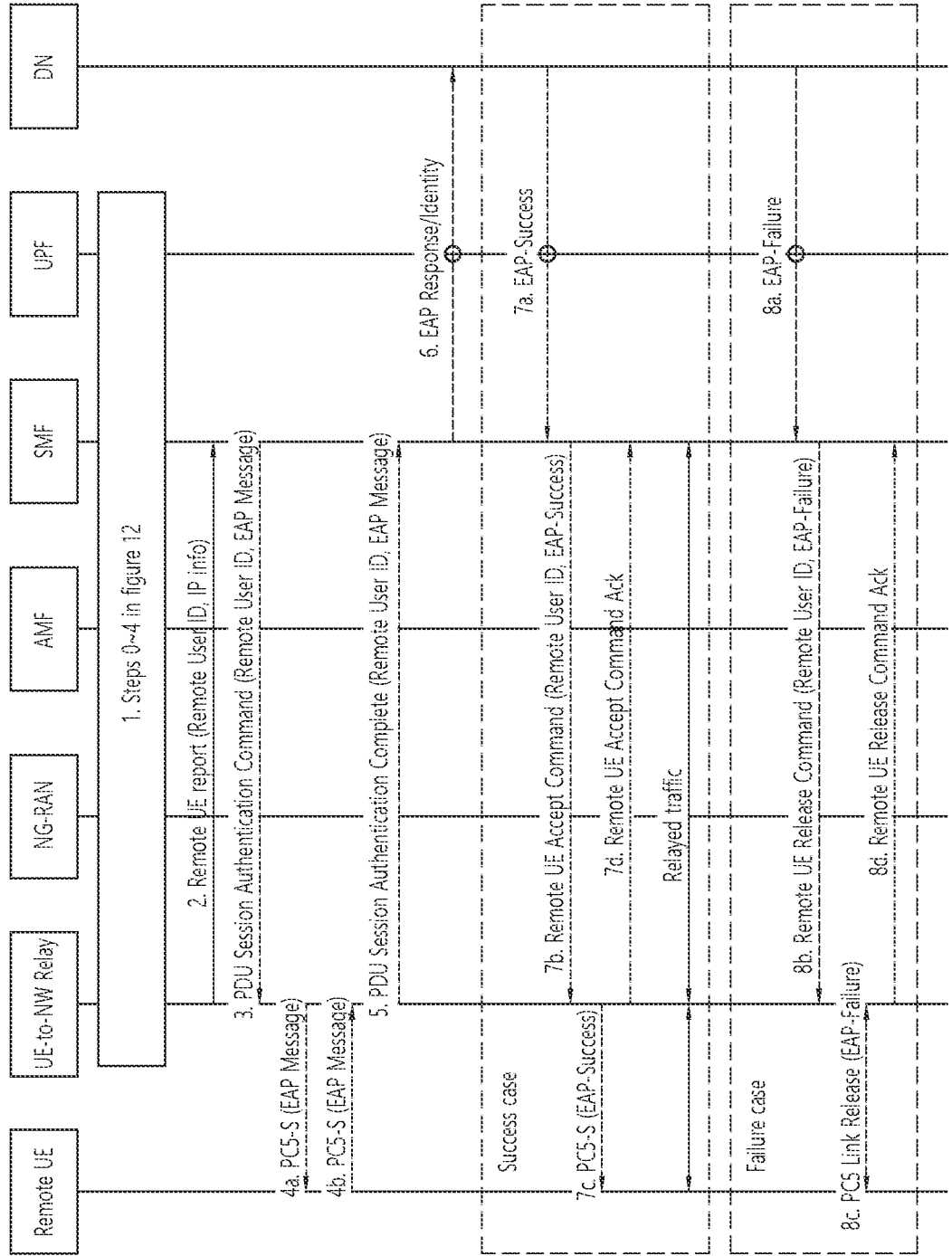
FIG. 14 is a diagram illustrating an example of a signal flow diagram according to a third example of the second disclosure of the present specification.

FIG. 14 is a diagram illustrating an example of a signal flow diagram according to a third example of the second disclosure of the present specification.

FIG. 14 shows Remote UE, UE-to-NW (Network) Relay (ie, Relay UE), NG-RAN, AMF, SMF, UPF and Data Network (DN).

1) The operations of steps 0) to 4) described in the example of FIGS. 12a and 12b may be performed.

2) The 5G ProSe UE-to-Network Relay may transmit a Remote UE Report message to the SMF for a PDU session related to the relay. The Remote UE Report message may include Remote User ID and IP information. Step 2) may be performed in the same manner as step 5) described with reference to FIGS. 12a and 12b.

3) When the SMF receives the Remote UE Report, if the Remote UE ID received by the SMF is SUCI, the SMF may perform the Option 1 operation or Option 2 operation of FIGS. 10a and 10b to convert the SUCI to SUPI. Thereafter, the SMF may retrieve the subscription data of the Remote UE from the UDM and receive the subscription data of the Remote UE from the UDM. And, the SMF may perform a secondary authentication/authorization procedure for the Remote UE. The SMF may transmit a PDU Session Authentication Command message including a Remote User ID to the 5G ProSe UE-to-Network Relay.

4a and 4b) The 5G ProSe UE-to-Network Relay may transmit an EAP message to the Remote UE through PC5 signaling. The Remote UE may transmit an EAP message to the Relay UE through PC5 signaling.

5) The 5G ProSe UE-to-Network Relay may transmit a PDU Session Authentication Complete message to the SMF. The PDU session authentication completion message may include a Remote User ID and an EAP message received from the Remote UE.

6) The SMF may transmit an EAP message (eg, EAP-Response/Identity message) to the DN-AAA server.

The DN-AAA server may perform secondary authentication/authentication based on the EAP message. According to the result of the secondary authentication/authorization, the operations corresponding to the Success case (steps 7a) to 7d)) shown in FIG. 14 or the operations corresponding to the Failure case (step 8a) to steps 8d)) may be performed.

7a) If the secondary authentication/authentication is successful, the DN-AAA server can confirm successful authentication/authentication by transmitting an EAP-Success message to the SMF.

7b) SMF may transmit Remote UE Accept Command message (including Remote User ID and EAP-Success message) to 5G ProSe UE-to-Network Relay.

7c) The 5G ProSe UE-to-Network Relay may transmit the EAP-Success message received in step 7b) to the Remote UE through PC5 signaling.

7d) The 5G ProSe UE-to-Network Relay may respond to the SMF by transmitting a Remote UE Accept Command Ack message to the SMF.

8a) If the secondary authentication/authorization fails, the DN-AAA server may notify the SMF of the authentication/authorization failure by transmitting an EAP-Failure message to the SMF.

8b) SMF may transmit a Remote UE Release Command message (including Remote User ID and EAP-Failure message) to the 5G ProSe UE-to-Network Relay.

8c) The 5G ProSe UE-to-Network Relay may release the PC5 link with the Remote UE identified by the Remote User ID by transmitting a Disconnect Request message to the Remote UE. The Disconnect Request message may include the EAP-Failure message received in step 8b).

8d) The 5G ProSe UE-to-Network Relay may respond to the SMF by transmitting a Remote UE Release Command Ack message to the SMF.

For reference, when a plurality of Remote UEs are connected to the 5G ProSe UE-to-Network Relay almost simultaneously, the network, the Remote UE, and the 5G ProSe UE-to-Network Relay may perform the secondary authentication procedure in parallel.

For reference, the DN-AAA server cannot distinguish whether the UE is connected to 5GC through the UE-to-Network Relay or is directly connected to 5GC.

For reference, a PDU session modification command message may be used instead of the Remote UE Accept Command message or the Remote UE Release Command message used in the example of FIG. 14. Alternatively, the SMF may transmit a Remote User ID, an EAP-Success message, and an EAP-Failure message to the 5G ProSe UE-to-Network Relay using other NAS messages. A PDU session modification command Ack message may be used instead of the Remote UE Accept Command Ack message or the Remote UE Release Command Ack message. Alternatively, the 5G ProSe UE-to-Network Relay may respond to the SMF using another NAS message.

When authentication for multiple Remote UEs is in progress, information on multiple remote UEs may be included in the Remote UE Accept Command message or Remote UE Release Command message in the form of a list. In this case, the SMF may transmit an EAP message related to each Remote UE together to the 5G ProSe UE-to-Network Relay.

Operations described through various examples in the first disclosure and/or the second disclosure of the present specification may include the following operations. The relay UE may request authentication for the Remote UE from the AMF based on the Remote UE ID transmitted by the Remote UE. The AMF may allocate a temporary ID for the successfully authenticated Remote UE, and transmit the temporary ID for the Remote UE to the Relay UE and the Remote UE. The AMF may determine whether the Remote UE currently available for a service through the Relay UE based on the subscription information of the Remote UE and the subscription information of the Relay UE. The Relay UE may transmit the session information and Remote UE ID information requested by the Remote UE to the SMF, in which case the Relay UE transmits an indication (or information) indicating that it is NAS signaling for the Remote UE and Remote UE ID information to the SMF by including the indication and the Remote UE ID information in the UL NAS Transport. The SMF may determine whether to perform secondary authentication for the Remote UE based on the information transmitted by the Relay UE, and if necessary, perform secondary authentication for the Remote UE. If necessary, the SMF may perform a procedure for changing the SUCI of the Remote UE to SUPI. The SMF may transmit information on whether authentication of the Remote UE is successful to the Relay UE. The Relay UE may determine whether to accept Direct Communication to the Remote UE based on the information received from the SMF. If authentication for the Remote UE fails, the SMF may release the PC5 connection to the Remote UE by transmitting a NAS message to the Relay UE.

As described in the disclosure of this specification, the network, the Relay UE, and the Remote UE may support authentication and/or secondary authentication/authorization for the Remote UE. That is, even when the Remote UE is connected to the Relay UE through an L3 relay that cannot transmit or receive NAS messages, the network, the Relay UE, and the Remote UE can perform authentication and/or secondary authentication/authorization for the Remote UE. In addition, the network may perform a procedure for converting the SUCI transmitted by the Remote UE to SUPI.

For reference, the operation of the terminal (eg, Remote UE or Relay UE) described in this specification may be implemented by the apparatus of FIGS. 15 to 20 to be described below. For example, the terminal (eg, Remote UE or Relay UE) may be the first wireless device 100 or the second wireless device 200 of FIG. 16. For example, the operation of the terminal (eg, Remote UE or Relay UE) described herein may be processed by one or more processors 102 or 202. The operations of the UE described herein may be stored in one or more memories 104 or 204 in the form of instructions/programs (e.g., executable code) executable by one or more processors 102 or 202. The one or more processors 102 or 202 may perform operation of the UE (eg, UE) described in the disclosure by controlling one or more memories 104 or 204 and one or more transceivers 106 or 206, and executing instructions/programs stored in the one or more memories 104 or 204 to be used in the present specification.

In addition, instructions for performing an operation of a terminal (eg, a Remote UE or a Relay UE) described in the disclosure of the present specification may be stored in a non-volatile computer-readable storage medium in which it is recorded. The storage medium may be included in one or more memories 104 or 204. And, the instructions recorded in the storage medium may be executed by one or more processors 102 or 202 to perform the operation of the terminal (eg, Remote UE or Relay UE) described in the disclosure of the present specification.

For reference, the operation of the network node (eg, AMF, SMF, UPF, UDM, DN, NG-RAN, DN-AAA server, RAUSF, etc.) described in this specification may be implemented by the apparatus of FIGS. 15 to 20 to be described below. For example, the network node may be the first wireless device 100 or the second wireless device 200 of FIG. 16. For example, the operation of the network nodes described herein may be handled by one or more processors 102 or 202. The operations of the network nodes described herein may be stored in one or more memories 104 or 204 in the form of instructions/programs (e.g. instructions, executable code) executable by one or more processors 102 or 202. The one or more processors 102 or 202 may perform operation of the network node described in the disclosure by controlling one or more memories 104 or 204 and one or more transceivers 106 or 206, and executing instructions/programs stored in the one or more memories 104 or 204 to be used in the present specification.

IV. Examples to which the Disclosure of this Specification is to be Applied

While not limited to thereto, the various descriptions, functions, procedures, suggestions, methods, and/or operational flowcharts of the present specification disclosed herein may be applied to in various fields requiring wireless communication/connection (e.g., 5G) between devices.

Hereinafter, a communication system to which the present specification can be applied is described in more detail with reference to the drawings. The same reference numerals in the following drawings/descriptions may illustrate the same or corresponding hardware blocks, software blocks, or functional blocks unless otherwise indicated.

Figure 15:
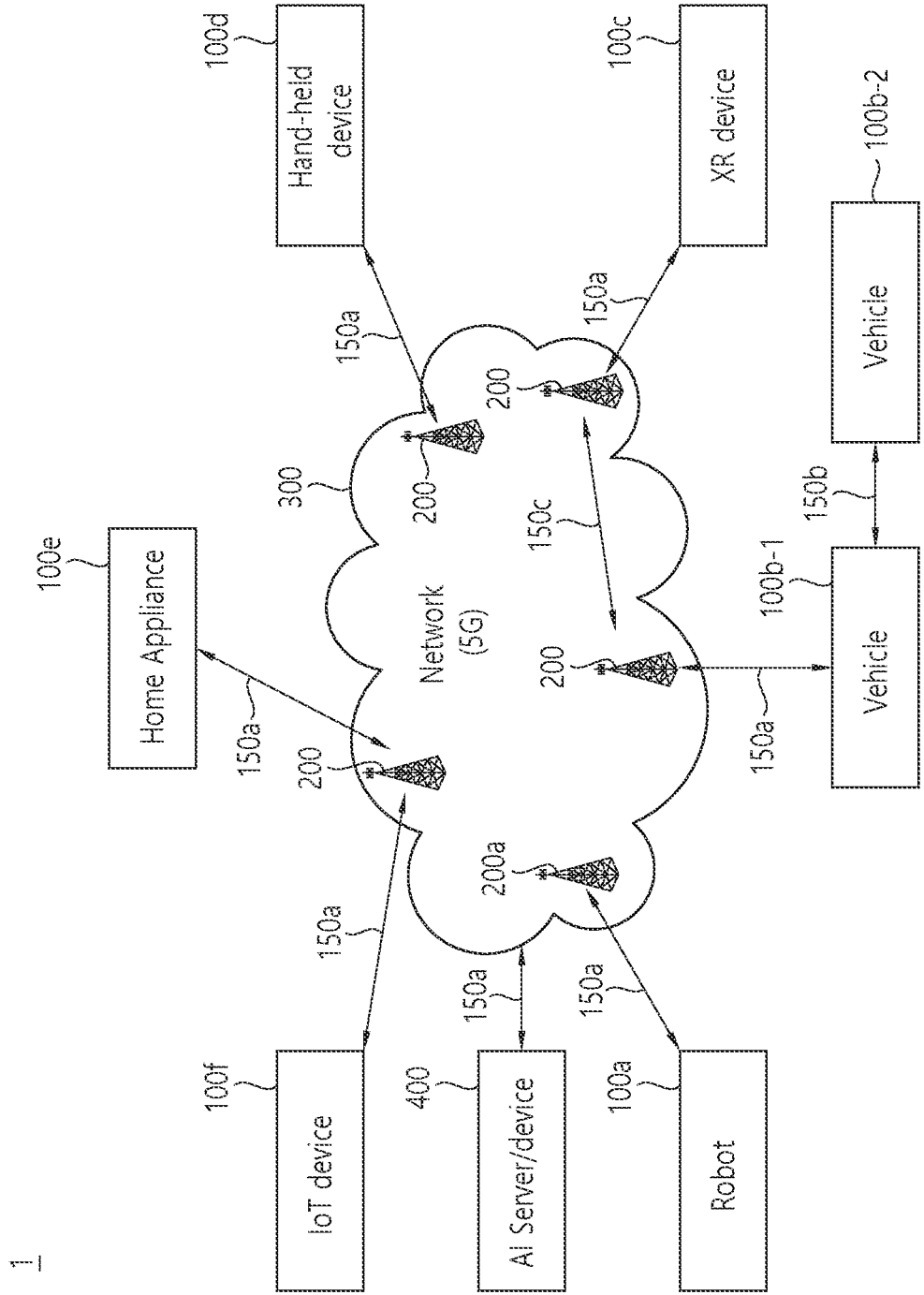
FIG. 15 illustrates a communication system 1 that can be applied to the present specification.

FIG. 15 illustrates a communication system 1 that can be applied to the present specification.

Referring to FIG. 15, a communication system 1 applied to the present specification includes a wireless device, a base station, and a network. Here, the wireless device means a device that performs communication using a wireless access technology (e.g., 5G New RAT (Long Term), Long Term Evolution (LTE)), and may be referred to as a communication/wireless/5G device. Although not limited thereto, the wireless device may include a robot 100*a*, a vehicle 100*b*-1, 100*b*-2, an eXtended Reality (XR) device 100*c*, a hand-held device 100*d*, a home appliance 100*e*, an Internet of Thing (IoT) device 100*f*, and the AI device/server 400. For example, the vehicle may include a vehicle having a wireless communication function, an autonomous vehicle, a vehicle capable of performing inter-vehicle communication, and the like. Here, the vehicle may include an unmanned aerial vehicle (UAV) (e.g., a drone). XR device may include AR (Augmented Reality)/VR (Virtual Reality)/MR (Mixed Reality) device. XR device may be implemented in the form of Head-Mounted Device (HMD), Head-Up Display (HUD), television, smartphone, a computer, a wearable device, a home appliance, a digital signage, a vehicle, a robot, and the like. The mobile device may include a smartphone, a smart pad, a wearable device (e.g., smart watch, smart glasses), and a computer (e.g., a laptop, etc.). The home appliance may include a TV, a refrigerator, a washing machine, and the like. IoT devices may include sensors, smart meters, and the like. For example, the base station and the network may be implemented as a wireless device, and the specific wireless device 200*a* may operate as a base station/network node to other wireless devices.

Figure 16:
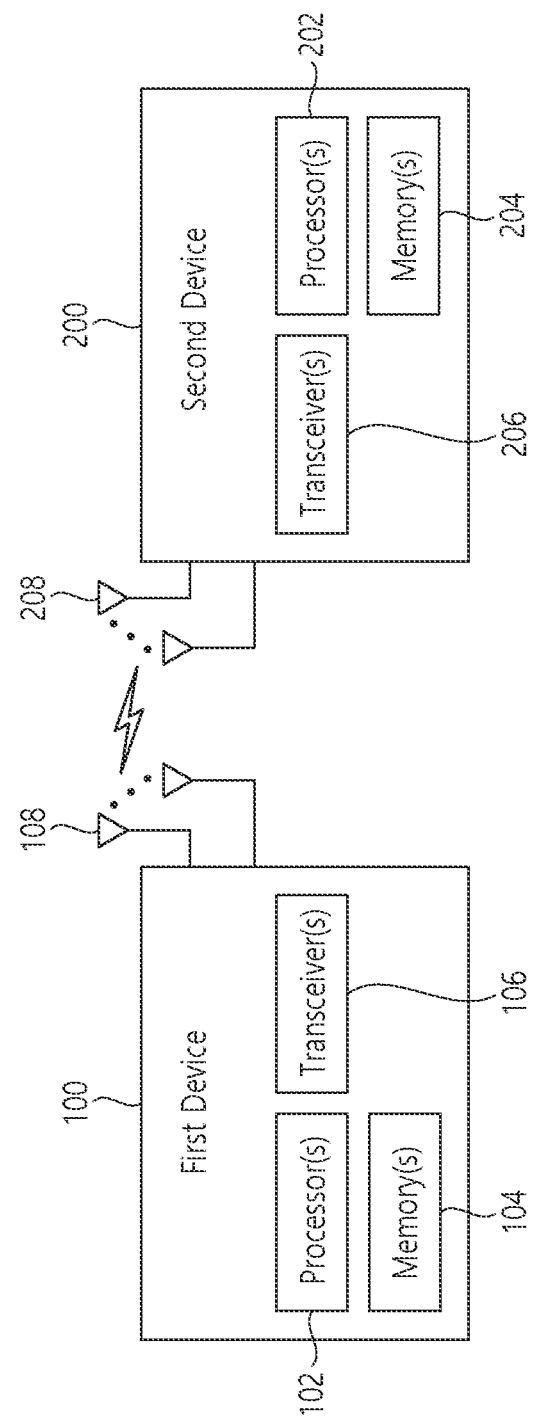
FIG. 16 illustrates an example of a wireless device that can be applied to the present specification.

Here, the wireless communication technology implemented in the wireless devices 100*a* to 100*f*, 400, and 100 and 200 of FIG. 16 of the present specification may include a narrowband Internet of Things for low-power communication as well as LTE, NR, and 6G. At this time, for example, NB-IoT technology may be an example of LPWAN (Low Power Wide Area Network) technology, and may be implemented in standards such as LTE Cat NB1 and/or LTE Cat NB2, and is not limited to the above-mentioned names. Additionally or alternatively, the wireless communication technology implemented in the wireless devices 100*a* to 100*f* and 400 of the present specification and 100 and 200 in FIG. 16 may perform communication based on the LTE-M technology. In this case, as an example, the LTE-M technology may be an example of an LPWAN technology, and may be called various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and the like, and is not limited to the above-described name. Additionally or alternatively, wireless communication technologies implemented in the wireless devices 100*a* to 100*f*, 400, and 100 and 200 in FIG. 16 of the present specification may include at leaste one of ZigBee in consideration of low-power communication, Bluetooth, and Low Power Wide Area Network (LPWAN), but is not limited to the above-described name. For example, the ZigBee technology can create PAN (personal area networks) related to small/low-power digital communication based on various standards such as IEEE 802.15.4, and can be called by various names.

The wireless devices 100*a* to 100*f* may be connected to the network 300 through the base station 200. AI (Artificial Intelligence) technology may be applied to the wireless devices 100*a* to 100*f*, and the wireless devices 100*a* to 100*f* may be connected to the AI server 400 through the network 300. The network 300 may be configured using a 3G network, a 4G (e.g. LTE) network, a 5G (e.g. NR) network, or the like. The wireless devices 100*a*-100*f* may communicate with each other via the base station 200/network 300, but may also communicate directly (e.g. sidelink communication) without passing through the base station/network. For example, the vehicles 100*b*-1 and 100*b*-2 may perform direct communication (e.g. vehicle to vehicle (V2V)/vehicle to everything (V2X) communication). In addition, the IoT device (e.g. sensor) may directly communicate with another IoT device (e.g. sensor) or another wireless device 100*a* to 100*f*.

A wireless communication/connection 150*a*, 150*b*, 150*c* may be performed between the wireless devices 100*a*-100*f*/base station 200 and base station 200/base station 200. Here, the wireless communication/connection is implemented based on various wireless connections (e.g., 5G NR) such as uplink/downlink communication 150*a*, sidelink communication 150*b* (or D2D communication), inter-base station communication 150*c* (e.g. relay, integrated access backhaul), and the like. The wireless device and the base station/wireless device, the base station, and the base station may transmit/receive radio signals to each other through the wireless communication/connections 150*a*, 150*b*, and 150*c*. For example, wireless communications/connections 150*a*, 150*b*, 150*c* may transmit/receive signals over various physical channels. To this end, based on various proposals of the present specification, At least some of various configuration information setting processes for transmitting/receiving a wireless signal, various signal processing processes (e.g., channel encoding/decoding, modulation/demodulation, resource mapping/demapping, etc.) may be performed.

FIG. 16 illustrates an example of a wireless device that can be applied to the present specification.

Referring to FIG. 16, the first wireless device 100 and the second wireless device 200 may transmit and receive wireless signals through various wireless access technologies (eg, LTE, NR). Here, {first wireless device 100, second wireless device 200} may refer to {wireless device 100x, base station 200} and/or {wireless device 100x, wireless device 100x} of FIG. 15. Alternatively, it may correspond to the first wireless device 100 and UE, AMF, SMF, or UPF, etc described in the disclosure of the present specification. In addition, the second wireless device 200 may correspond to a UE, AMF, SMF, or UPF, etc. The first wireless device 100 includes one or more processors 102 and one or more memories 104, and may further include one or more transceivers 106 and/or one or more antennas 108. The processor 102 controls the memory 104 and/or the transceiver 106 and may be configured to implement the descriptions, functions, procedures, suggestions, methods and/or operational flowcharts disclosed herein. For example, the processor 102 may process the information in the memory 104 to generate a first information/signal, and then transmit the wireless signal including the first information/signal through the transceiver 106. In addition, the processor 102 may receive the radio signal including a second information/signal through the transceiver 106 and store the information obtained from the signal processing of the second information/signal in the memory 104. The memory 104 may be connected to the processor 102 and may store various information related to the operation of the processor 102. For example, the memory 104 may store software code that includes instructions to perform some or all of the processes controlled by the processor 102 or to perform descriptions, functions, procedures, suggestions, methods and/or operational flowcharts disclosed herein. Here, the processor 102 and memory 104 may be part of a communication modem/circuit/chip designed to implement wireless communication technology (e.g., LTE, NR). The transceiver 106 may be coupled with the processor 102 and may transmit and/or receive wireless signals via one or more antennas 108. The transceiver 106 may include a transmitter and/or a receiver. The transceiver 106 may be described as being mixed with a radio frequency (RF) unit. In the present specification, a wireless device may mean a communication modem/circuit/chip.

The second wireless device 200 may include one or more processors 202, one or more memories 204, and may further include one or more transceivers 206 and/or one or more antennas 208. The processor 202 controls the memory 204 and/or the transceiver 206 and may be configured to implement the descriptions, functions, procedures, suggestions, methods and/or operational flowcharts disclosed herein. For example, the processor 202 may process the information in the memory 204 to generate third information/signal, and then transmit a wireless signal including the third information/signal through the transceiver 206. In addition, the processor 202 may receive the radio signal including the fourth information/signal through the transceiver 206 and then store the information obtained from the signal processing of the fourth information/signal in the memory 204. The memory 204 may be connected to the processor 202 and store various information related to the operation of the processor 202. For example, the memory 204 may store software code that include instructions to perform some or all of the processes controlled by the processor 202 or to perform descriptions, functions, procedures, suggestions, methods and/or operational flowcharts disclosed herein. Here, processor 202 and memory 204 may be part of a communication modem/circuit/chip designed to implement wireless communication technology (e.g., LTE, NR). The transceiver 206 may be coupled with the processor 202 and may transmit and/or receive wireless signals via one or more antennas 208. The transceiver 206 may include a transmitter and/or a receiver. The transceiver 206 may be described being mixed with an RF unit. In the present specification, a wireless device may mean a communication modem/circuit/chip.

Hereinafter, hardware elements of the wireless devices 100 and 200 will be described in more detail. One or more protocol layers may be implemented by one or more processors 102, 202. The hardware elements of the wireless devices 100 and 200 are not limited thereto. For example, one or more processors 102 and 202 may implement one or more layers (e.g., functional layers such as PHY, MAC, RLC, PDCP, RRC, SDAP). One or more processors 102, 202 may generate one or more Protocol Data Units (PDUs) and/or one or more Service Data Units (SDUs) based on the descriptions, functions, procedures, suggestions, methods and/or operational flowcharts disclosed herein. One or more processors 102, 202 may generate messages, control information, data or information in accordance with the descriptions, functions, procedures, suggestions, methods and/or operational flowcharts disclosed herein. One or more processors 102, 202 may generate signals (e.g., baseband signals) including PDUs, SDUs, messages, control information, data or information in accordance with the functions, procedures, suggestions and/or methods disclosed herein, and may provide the signals to one or more transceivers 106 and 206. One or more processors 102, 202 may receive signals (e.g., baseband signals) from one or more transceivers 106, 206 and may obtain the PDU, the SDU, the message, the control information, the data, or the information based on a description, functions, procedures, suggestions, methods, and/or operational flowcharts disclosed herein.

The descriptions, functions, procedures, suggestions, methods, and/or operational flowcharts disclosed herein may be implemented using firmware or software, and the firmware or software may be implemented to include modules, procedures, functions, and the like. Firmware or software configured to perform the descriptions, functions, procedures, suggestions, methods, and/or operational flowcharts disclosed herein may be included in one or more processors (102, 202), or may be stored in one or more memories (104, 204) and be executed by the processor (102, 202). The descriptions, functions, procedures, suggestions, methods, and/or operational flowcharts disclosed herein may be implemented using firmware or software in the form of code, instructions, and/or a set of instructions.

One or more memories 104, 204 may be coupled with one or more processors 102, 202 and may store various forms of data, signals, messages, information, programs, codes, instructions, and/or instructions. One or more memories 104, 204 may be comprised of ROM, RAM, EPROM, flash memory, hard drive, registers, cache memory, computer readable storage medium, and/or combinations thereof. One or more memories 104, 204 may be located inside and/or outside one or more processors 102, 202. In addition, one or more memories 104, 204 may be coupled with one or more processors 102, 202 through various techniques, such as a wired or wireless connection.

One or more transceivers 106 and 206 may transmit user data, control information, wireless signals/channels, etc., as mentioned in the methods and/or operational flowcharts of this document, to one or more other devices. One or more transceivers 106 and 206 may receive, from one or more other devices, user data, control information, wireless signals/channels, etc., as mentioned in the descriptions, functions, procedures, suggestions, methods and/or operational flowcharts disclosed herein. For example, one or more transceivers 106 and 206 may be coupled with one or more processors 102 and 202 and may transmit and receive wireless signals. For example, one or more processors 102 and 202 may control one or more transceivers 106 and 206 to transmit user data, control information or wireless signals to one or more other devices. In addition, one or more processors 102 and 202 may control one or more transceivers 106 and 206 to receive user data, control information or wireless signals from one or more other devices. In addition, one or more transceivers 106, 206 may be coupled with one or more antennas 108, 208. One or more transceivers 106, 206 may be configured to transmit and receive user data, control information, wireless signals/channels, etc., which are mentioned in the procedures, functions, descriptions, suggestions, methods and/or operational flowcharts, and the like via one or more antennas 108, 208. In the present disclosure, one or more antennas may be a plurality of physical antennas or a plurality of logical antennas (e.g., antenna ports). One or more transceivers 106, 206 may convert the received wireless signal/channel or the like from RF band signal to a baseband signal to process user data, control information, wireless signals/channels, etc. in an one or more processors 102, 202. One or more transceivers 106 and 206 may use the one or more processors 102 and 202 to convert processed user data, control information, wireless signals/channels, etc. from baseband signals to RF band signals. To this end, one or more transceivers 106 and 206 may include (analog) oscillators and/or filters.

Figure 17:
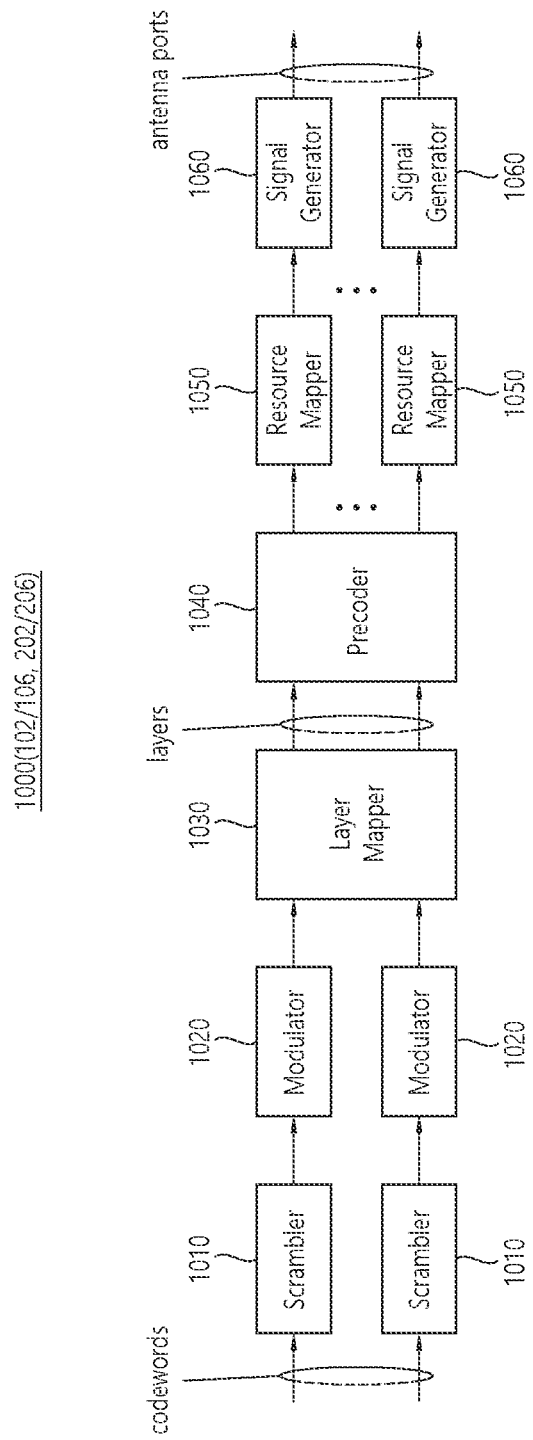
FIG. 17 illustrates an example of a signal processing circuit for a transmission signal.

FIG. 17 illustrates an example of a signal processing circuit for a transmission signal.

Referring to FIG. 17, the signal processing circuit 1000 may include a scrambler 1010, a modulator 1020, a layer mapper 1030, a precoder 1040, a resource mapper 1050, and a signal generator 1060. Although not limited thereto, the operations/functions of FIG. 17 may be performed in the processor (102, 202), the memory (104, 204) and/or transceiver (106, 206) of FIG. 16. The hardware element of FIG. 17 may be implemented in the processors 102 and 202 and/or the transceivers 106 and 206 of FIG. 16. For example, blocks 1010-1060 may be implemented in the processors 102, 202 of FIG. 16. Also, blocks 1010-1050 may be implemented in the processors 102 and 202 of FIG. 16, and block 1060 may be implemented in the transceivers 106 and 206 of FIG. 16.

The codeword may be converted into a wireless signal through the signal processing circuit 1000 of FIG. 17. Here, the codeword is an encoded bit sequence of the information block. The information block may include a transport block (e.g., a UL-SCH transport block and a DL-SCH transport block). The wireless signal may be transmitted through various physical channels (e.g., PUSCH, PDSCH).

In detail, the codeword may be converted into a scrambled bit sequence by the scrambler 1010. The scramble sequence used for scramble is generated based on the initialization value, and the initialization value may include ID information of the wireless device. The scrambled bit sequence may be modulated into a modulation symbol sequence by the modulator 1020. The modulation scheme may include pi/2-Binary Phase Shift Keying (pi/2-BPSK), m-Phase Shift Keying (m-PSK), m-Quadrature Amplitude Modulation (m-QAM), and the like. The complex modulation symbol sequence may be mapped to one or more transport layers by the layer mapper 1030. The modulation symbols of each transport layer may be mapped (precoding) to the corresponding antenna port (s) by the precoder 1040. The output z of the precoder 1040 may be obtained by multiplying the output y of the layer mapper 1030 by the precoding matrix W of N*M. Where N is the number of antenna ports and M is the number of transport layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to time-frequency resources. The time-frequency resource may include a plurality of symbols (e.g., CP-OFDMA symbols, DFT-s-OFDMA symbols) in the time domain, and may include a plurality of subcarriers in the frequency domain. The signal generator 1060 generates a radio signal from the mapped modulation symbols, and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

The signal processing procedure for the received signal in the wireless device may be configured in the reverse manner of the signal processing procedures 1010~1060 of FIG. 17. For example, a wireless device (e.g., 100 and 200 of FIG. 16) may receive a wireless signal from the outside through an antenna port/transceiver. The received wireless signal may be converted into a baseband signal through a signal recoverer. To this end, the signal recoverer may include a frequency downlink converter, an analog-to-digital converter (ADC), a CP canceller, and a fast fourier transform (FFT) module. Thereafter, the baseband signal may be restored to a codeword through a resource de-mapper process, a postcoding process, a demodulation process, and a de-scramble process. The codeword may be restored to the original information block through decoding. Thus, signal processing circuitry (not shown) for the received signal may include a signal recoverer, a resource de-mapper, a postcoder, a demodulator, a de-scrambler and a decoder.

Figure 18:
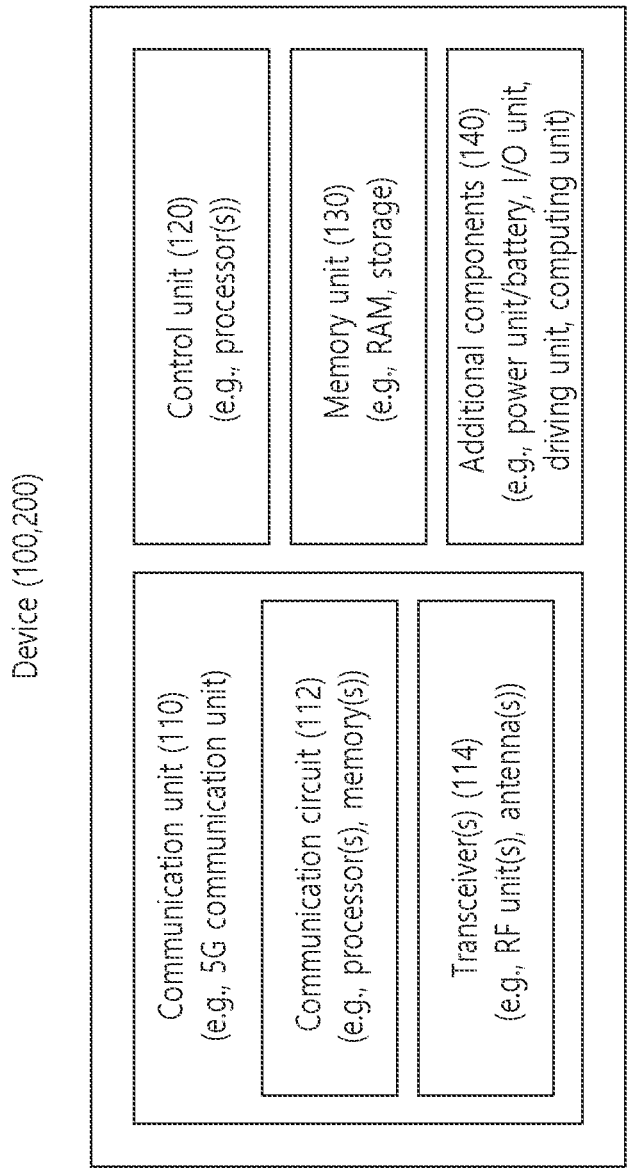
FIG. 18 illustrates another example of a wireless device that can be applied to the present specification.

FIG. 18 illustrates another example of a wireless device that can be applied to the present specification.

The wireless device may be implemented in various forms according to use-examples/services (refer to FIG. 15).

Referring to FIG. 18, the wireless devices 100 and 200 correspond to the wireless devices 100 and 200 of FIG. 16, and the wireless devices 100 and 200 may be configured with various elements, components, units, and/or modules. For example, the wireless device 100, 200 may include a communication unit 110, a control unit 120, a memory unit 130, and additional components 140. The communication unit may include communication circuit 112 and transceiver (s) 114. For example, the communication circuit 112 may include one or more processors 102, 202 and/or one or more memories 104, 204 of FIG. 16. For example, the transceiver (s) 114 may include one or more transceivers 106, 206 and/or one or more antennas 108, 208 of FIG. 16. The control unit 120 is electrically connected to the communication unit 110, the memory unit 130, and the additional components 140, and controls various operations of the wireless device. For example, the control unit 120 may control the electrical/mechanical operation of the wireless device based on the program/code/command/information stored in the memory unit 130. In addition, the control unit 120 may transmit information stored in the memory unit 130 to the outside (e.g., another communication device) through the communication unit 110 through a wireless/wired interface. The control unit 120 may store the information received through the wireless/wired interface from the outside (e.g., another communication device) through the communication unit 110 in the memory unit 130. For example, the control unit 120 may include one or more processors 102 and 202 and/or one or more memories 104 and 204 of FIG. 16. For example, the memory unit 130 may include one or more memories 104 and 204 of FIG. 16.

The additional components 140 may be variously configured according to the type of the wireless device. For example, the additional components 140 may include at least one of a power unit/battery, an input/output unit, a driving unit, and a computing unit. Although not limited thereto, the wireless device may be implemented in the form of a robot (FIG. 15, 100a), a vehicle (FIG. 15, 100b-1, 100b-2), an XR device (FIG. 15, 100c), a portable device (FIG. 15, 100d), a home appliance. (FIG. 15, 100e), IoT devices (FIG. 15, 100f), terminals for digital broadcasting, hologram devices, public safety devices, MTC devices, medical devices, fintech devices (or financial devices), security devices, climate/environment devices, an AI server/device (FIGS. 12 and 400), a base station (FIGS. 12 and 200), a network node, and the like. The wireless device may be used in a mobile or fixed location depending on the usage-example/service.

In FIG. 18, various elements, components, units/units, and/or modules in the wireless devices 100 and 200 may be entirely interconnected through a wired interface, or at least a part of them may be wirelessly connected through the communication unit 110. For example, the control unit 120 and the communication unit 110 are connected by wire in the wireless device 100 or 200, and the control unit 120 and the first unit (e.g., 130 and 140) are connected wirelessly through the communication unit 110. In addition, each element, component, unit/unit, and/or module in wireless device 100, 200 may further include one or more elements. For example, the control unit 120 may be composed of one or more processor sets. For example, the control unit 120 may be configured as a set of a communication control processor, an application processor, an electronic control unit (ECU), a graphics processing processor, a memory control processor, and the like. As another example, the memory unit 130 may include random access memory (RAM), dynamic RAM (DRAM), read only memory (ROM), flash memory, volatile memory, and non-volatile memory and/or combinations thereof.

Figure 19:
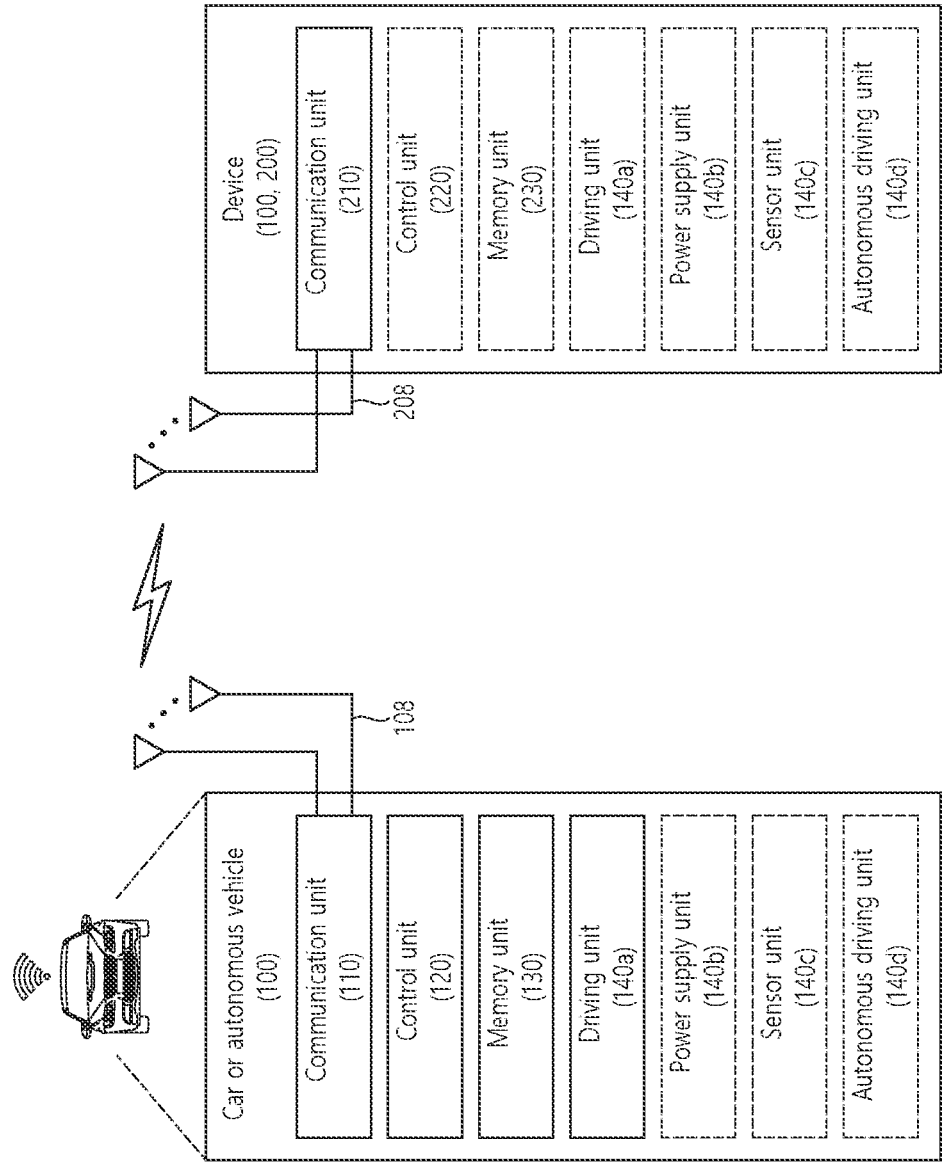
FIG. 19 illustrates an example of a vehicle or an autonomous vehicle that can be applied to the present specification.

FIG. 19 illustrates an example of a vehicle or an autonomous vehicle that can be applied to the present specification.

FIG. 19 illustrates a vehicle or autonomous vehicle applied to the disclosure of this specification. The vehicle or autonomous driving vehicle may be implemented as a mobile robot, a vehicle, a train, an aerial vehicle (AV), a ship, and the like.

Referring to FIG. 19, the vehicle or the autonomous vehicle 100 may include an antenna unit 108, a communication unit 110, a control unit 120, a driving unit 140a, a power supply unit 140b, a sensor unit 140c, and autonomous driving unit 140d. The antenna unit 108 may be configured as part of the communication unit 110. The blocks 110/130/140a to 140d may correspond to blocks 110/130/140 of FIG. 18, respectively.

The communication unit 110 may transmit or receive signals (e.g., data, control signals, etc.) with external devices, such as base stations (e.g. base stations, road side units, etc.), servers, and the like. The control unit 120 may control various elements of the vehicle or the autonomous vehicle 100 to perform various operations. The control unit 120 may include an ECU (Electronic Control Unit). The driving unit 140a may cause the vehicle or the autonomous vehicle 100 to drive on the ground. The driving unit 140a may include an engine, a motor, a power train, wheels, a brake, a steering device, and the like. The power supply unit 140b supplies power to the vehicle or the autonomous vehicle 100, and may include a wired/wireless charging circuit, a battery, and the like. The sensor unit 140c may obtain vehicle status, surrounding environment information, user information, and the like. The sensor unit 140c includes an inertial measurement unit (IMU) sensor, a collision sensor, a wheel sensor, a speed sensor, an inclination sensor, a weight sensor, a heading sensor, a position module, a position forward, and a vehicle forward/reverse sensors, battery sensors, fuel sensors, tire sensors, steering sensors, temperature sensors, humidity sensors, ultrasonic sensors, illuminance sensors, pedal position sensors, and the like. The autonomous driving unit 140d may implement a technology for maintaining a driving lane, a technology for automatically adjusting speed such as adaptive cruise control, a technology for automatically driving along a predetermined route, and automatically setting a route when a destination, and the like.

For example, the communication unit 110 may receive map data, traffic information data, and the like from an external server. The autonomous driving unit 140d may generate an autonomous driving route and a driving plan based on the obtained data. The control unit 120 may control the driving unit 140a to move the vehicle or the autonomous vehicle 100 along the autonomous driving path according to the driving plan (e.g., speed/direction adjustment). During autonomous driving, the communication unit 110 may acquire the latest traffic information data periodically or aperiodically from an external server and may obtain the surrounding traffic information data from the surrounding vehicles. In addition, during autonomous driving, the sensor unit 140c may acquire vehicle state and surrounding environment information. The autonomous driving unit 140d may update the autonomous driving route and the driving plan based on the newly obtained data/information. The communication unit 110 may transmit information regarding a vehicle location, an autonomous driving route, a driving plan, and the like to an external server. The external server may predict traffic information data in advance using AI technology or the like based on information collected from the vehicle or autonomous vehicles, and provide the predicted traffic information data to the vehicle or autonomous vehicles.

Figure 20:
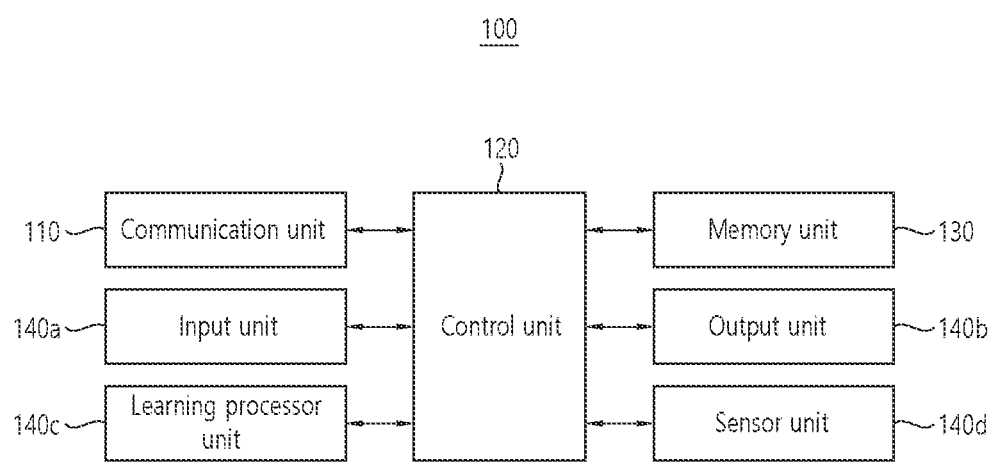
FIG. 20 illustrates an example of an AI device that can be applied to the disclosure of the present specification.

FIG. 20 illustrates an example of an AI device that can be applied to the disclosure of the present specification.

FIG. 20 illustrates an example of an AI device applied to the disclosure of the present specification. An AI device may be implemented as a fixed device or a mobile device, such as TVs, projectors, smartphones, PCs, laptops, digital broadcasting terminals, tablet PCs, wearable devices, set-top boxes (STBs), radios, washing machines, refrigerators, digital signage, robots, vehicles, and the like.

Referring to FIG. 20, the AI device 100 includes a communication unit 110, a control unit 120, a memory unit 130, an input/output unit 140a/140b, a learning processor unit 140c, and a sensor unit 140d. Blocks 110 to 130/140a to 140d respectively correspond to blocks 110 to 130/140 of FIG. 18.

The communication unit 110 communicates may transmit or receive wired signals and wireless signals (e.g., sensor information, user input, learning model, control signal, etc.) with external devices such as another AI device (e.g., FIG. 1, 100x, 200, 400) or an AI server (e.g., 400 of FIG. 15) by using a wired or wireless communication technology. To this end, the communication unit 110 may transmit information in the memory unit 130 to an external device, or may transmit a signal received from the external device to the memory unit 130.

The control unit 120 may determine at least one executable operation of the AI device 100 based on the information determined or generated using the data analysis algorithm or the machine learning algorithm. In addition, the control unit 120 may control the components of the AI device 100 to perform the determined operation. For example, the control unit 120 may request, search, receive, or utilize data of the running processor 140c or the memory 130. The control unit 120 may control the components of the AI device 100 to execute a predicted or desirable operation among at least one executable operation. In addition, the control unit 120 collects history information including the operation contents of the AI device 100 or the user's feedback on the operation, and stores the information in the memory unit 130 or the running processor unit 140c or transmits the information to an external device such as an AI server (FIG. 15, 400). The collected historical information can be used to update the learning model.

The memory unit 130 may store data supporting various functions of the AI device 100. For example, the memory unit 130 may store data obtained from the input unit 140a, data obtained from the communication unit 110, output data of the learning processor unit 140c, and data obtained from the sensing unit 140. In addition, the memory unit 130 may store control information and/or software code necessary for operation/execution of the control unit 120.

The input unit 140a may obtain various types of data from the outside of the AI device 100. For example, the input unit 140a may acquire training data for model learning, input data to which the training model is applied, and the like. The input unit 140a may include a camera, a microphone, and/or a user input unit. The output unit 140b may generate an output related to sight, hearing, or touch. The output unit 140b may include a display unit, a speaker, and/or a haptic module. The sensing unit 140 may obtain at least one of internal information of the AI device 100, environment information of the AI device 100, and user information using various sensors. The sensing unit 140 may include a proximity sensor, an illumination sensor, an acceleration sensor, a magnetic sensor, a gyro sensor, an inertial sensor, an RGB sensor, an IR sensor, a fingerprint sensor, an ultrasonic sensor, an optical sensor, a microphone, and/or a radar, and the like.

The learning processor unit 140c may train a model composed of artificial neural networks using the training data. The learning processor unit 140c may perform AI processing together with the learning processor unit of the AI server (FIGS. 12 and 400). The learning processor unit 140c may process information received from an external device through the communication unit 110 and/or information stored in the memory unit 130. In addition, the output value of the learning processor unit 140c may be transmitted to the external device through the communication unit 110 and/or stored in the memory unit 130.

The following drawings were created to explain a specific example of the present specification. The names of specific devices described in the drawings or the names of specific signals/messages/fields are presented by way of example, so that the technical features of the present specification are not limited to the specific names used in the following drawings.

As described above, although the embodiments have been described as examples, since the content and scope of this specification will not be limited only to a particular embodiment of this specification, this specification may be amended, modified, or enhanced to other various forms.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for a Session Management Function (SMF) node to perform authentication, comprising:
    receiving a Remote User Equipment (UE) report message related to a remote UE connected to a relay UE from the relay UE;
    transmitting a request message to a unified data management (UDM) node or an access and mobility management function (AMF) node, based on that the Remote UE report message includes a Subscription Concealed Identifier (SUCI) of the remote UE;
    receiving, from the UDM node or the AMF node, a response message including a Subscription Permanent Identifier (SUPI) of the remote UE, in response to the request message; and
    transmitting an authentication request message requesting authentication for the remote UE to an authentication server, based on that the Remote UE report message is received,
    wherein the authentication request message includes a SUPI of the remote UE.

2. The method of claim 1, further comprising:
    receiving a response message including information on the authentication result for the remote UE, in response to the authentication request message from the authentication server.

3. The method of claim 2, further comprising:
    transmitting a response message including information on the authentication result for the remote UE to the relay UE.

4. The method of claim 1, further comprising:
receiving, from the UDM node, the subscription data of the remote UE.

5. The method of claim 4, further comprising:
determining whether to perform authentication for the remote UE, based on the subscription data of the Remote-remote UE.

6. The method of claim 5, when authentication for the remote UE is determined to be performed, the authentication request message is transmitted to the authentication server.

7. A method for a relay User Equipment (UE) to perform authentication, comprising:
receiving a direct communication request message from the Remote a remote UE;
transmitting a Remote UE report message to a Session Management Function (SMF) node, based on the direct communication request message being received; and
receiving a message including an authentication result for the remote UE from the SMF node,
wherein the direct communication request message includes Remote UE ID information of the remote UE,
wherein the Remote UE ID information includes a Subscription Concealed Identifier (SUCI) of the remote UE,
wherein the SUCI of the remote UE is used by the SMF node to obtain a Subscription Permanent Identifier (SUPI) of the remote UE.

8. The method of claim 7, wherein the SUPI of the remote UE is included in an authentication request message for the remote UE that to be transmitted by the SMF node to an authentication server.

9. The method of claim 7, further comprising:
when the authentication result for the remote UE includes information indicating that authentication for the remote UE has failed or a request to stop the service of the remote UE, releasing the connection between the remote UE and the relay UE.

10. The method of claim 9, wherein the connection between the remote UE and the relay UE is a PC5 link.

11. The method of claim 7, further comprising:
transmitting a Remote UE registration request message to an access and mobility management function (AMF) node; and
receiving a Remote UE registration accept message from the AMF node, in response to the Remote UE registration request message.

12. A relay User Equipment (UE) that performs authentication, the relay UE comprising:
at least one processor; and
at least one memory storing instructions and operably electrically connectable with the at least one processor, wherein the operations performed based on the execution of the instructions by the at least one processor include:
receiving a direct communication request message from a remote UE;
transmitting a Remote UE report message to a Session Management Function (SMF) node, based on the direct communication request message being received; and
receiving a message including an authentication result for the remote UE from the SMF node,
wherein the direct communication request message includes Remote UE ID information of the remote UE,
wherein the Remote UE ID information includes a Subscription Concealed Identifier (SUCI) of the remote UE,
wherein the SUCI of the remote UE is used by the SMF node to obtain a Subscription Permanent Identifier (SUPI) of the Remote remote UE.

13. The relay UE of claim 12, wherein the relay UE is an autonomous driving device that communicates with at least one of a mobile terminal, a network, and an autonomous vehicle other than the relay UE.

* * * * *